US012573273B2

(12) United States Patent
Soltan

(10) Patent No.: US 12,573,273 B2
(45) Date of Patent: Mar. 10, 2026

(54) AUDIO ASSISTED FILE SHARING

(71) Applicant: Mehdi Frederik Soltan, Hong Kong (HK)

(72) Inventor: Mehdi Frederik Soltan, Hong Kong (HK)

( * ) Notice: Subject to any disclaimer, the term of this patent is extended or adjusted under 35 U.S.C. 154(b) by 389 days.

(21) Appl. No.: 18/471,329

(22) Filed: Sep. 21, 2023

(65) Prior Publication Data

US 2025/0104542 A1      Mar. 27, 2025

(51) Int. Cl.
| | |
|---|---|
| *G08B 3/10* | (2006.01) |
| *G06K 19/06* | (2006.01) |
| *G08B 5/22* | (2006.01) |
| *H04L 9/40* | (2022.01) |
| *H04L 67/06* | (2022.01) |

(52) U.S. Cl.
CPC ......... *G08B 3/10* (2013.01); *G06K 19/06037* (2013.01); *G08B 5/22* (2013.01); *H04L 63/0435* (2013.01); *H04L 67/06* (2013.01)

(58) Field of Classification Search
CPC ...... G08B 3/10; G08B 5/22; G06K 19/06037; H04L 63/0435; H04L 67/06; H04L 63/0442; H04L 29/08; H04L 69/40; G06F 15/173
See application file for complete search history.

(56) References Cited

U.S. PATENT DOCUMENTS 6,058,399 A * 5/2000 Morag .................... H04L 67/06
707/610

* cited by examiner

*Primary Examiner* — Quan Zhen Wang
*Assistant Examiner* — Rajsheed O Black-Childress

(57) ABSTRACT

In a method of file transfer a first request for generating a session is transmitted and a session identification (session-ID) of the generated session and a first public key associated with the session-ID is received. In response to receiving the first public key, one or more files are uploaded. In response to uploading the one or more files, a second public key is received. In response to receiving the second public key, a notification message is generated that the one or more files are uploaded. The notification message includes the second public key and the session-ID.

25 Claims, 16 Drawing Sheets

330

335

335

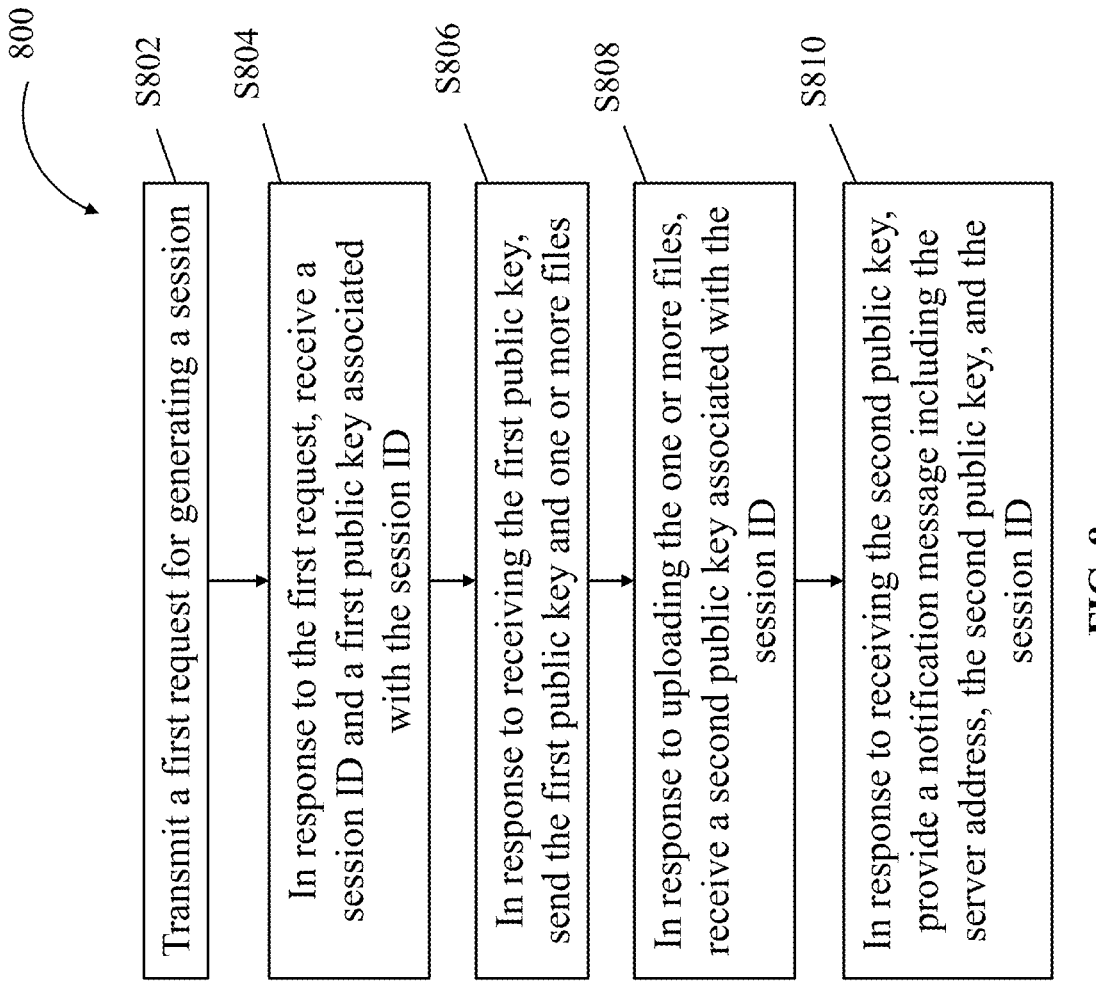

800

S802 Transmit a first request for generating a session

S804 In response to the first request, receive a session ID and a first public key associated with the session ID S806 In response to receiving the first public key, send the first public key and one or more files S808 In response to uploading the one or more files, receive a second public key associated with the session ID S810 In response to receiving the second public key, provide a notification message including the server address, the second public key, and the session ID

FIG. 8

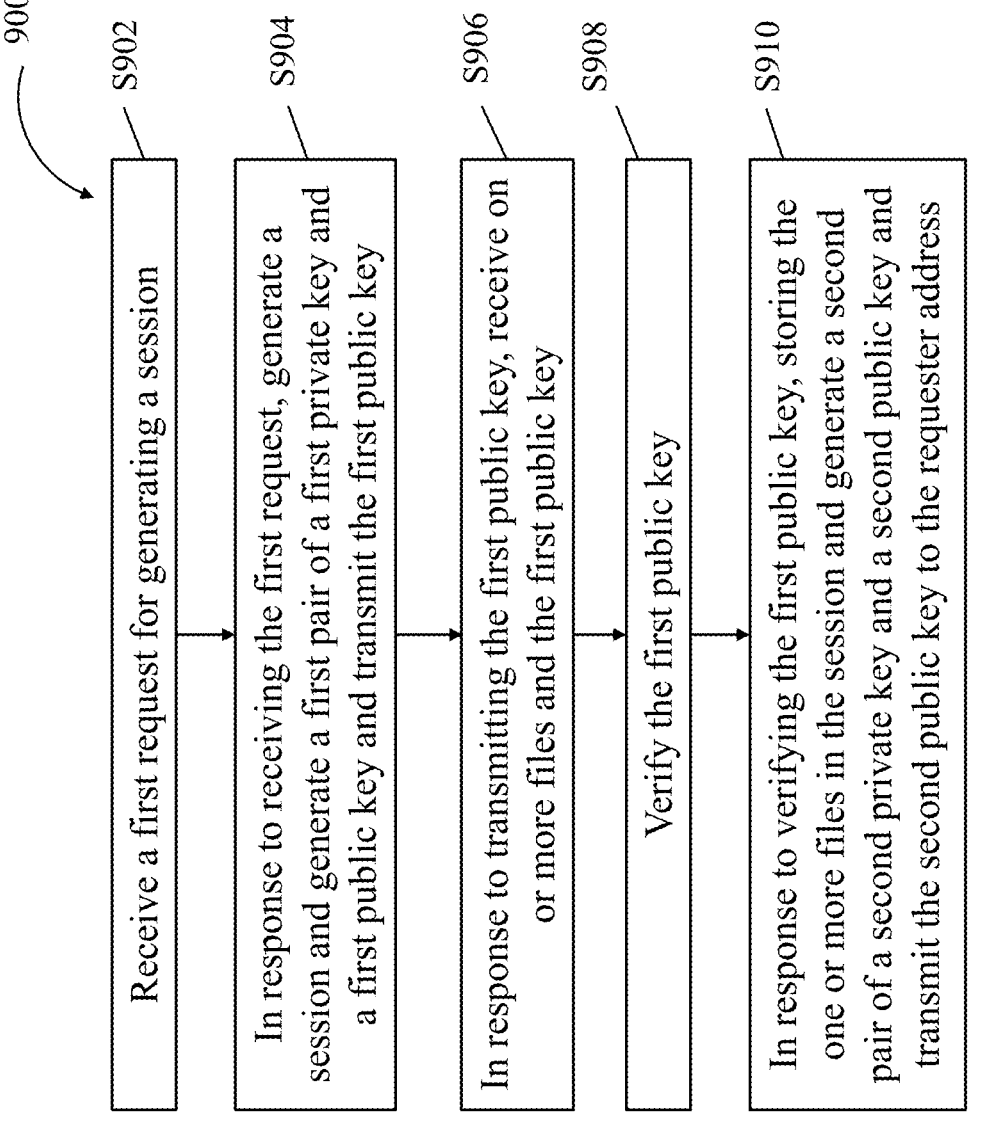

900

S902 Receive a first request for generating a session

S904 In response to receiving the first request, generate a session and generate a first pair of a first private key and a first public key and transmit the first public key S906 In response to transmitting the first public key, receive on or more files and the first public key S908 Verify the first public key S910 In response to verifying the first public key, storing the one or more files in the session and generate a second pair of a second private key and a second public key and transmit the second public key to the requester address

FIG. 9

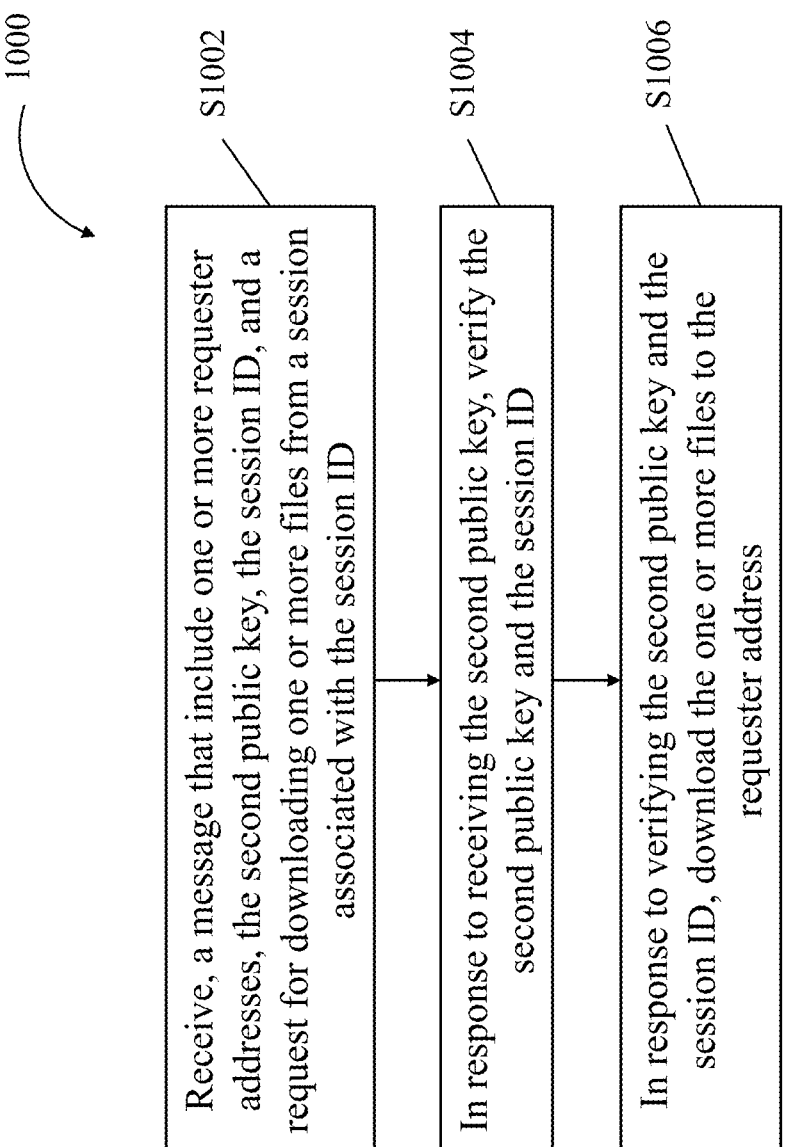

1000

S1002

Receive, a message that include one or more requester addresses, the second public key, the session ID, and a request for downloading one or more files from a session associated with the session ID

S1004

In response to receiving the second public key, verify the second public key and the session ID

S1006

In response to verifying the second public key and the session ID, download the one or more files to the requester address

FIG. 10

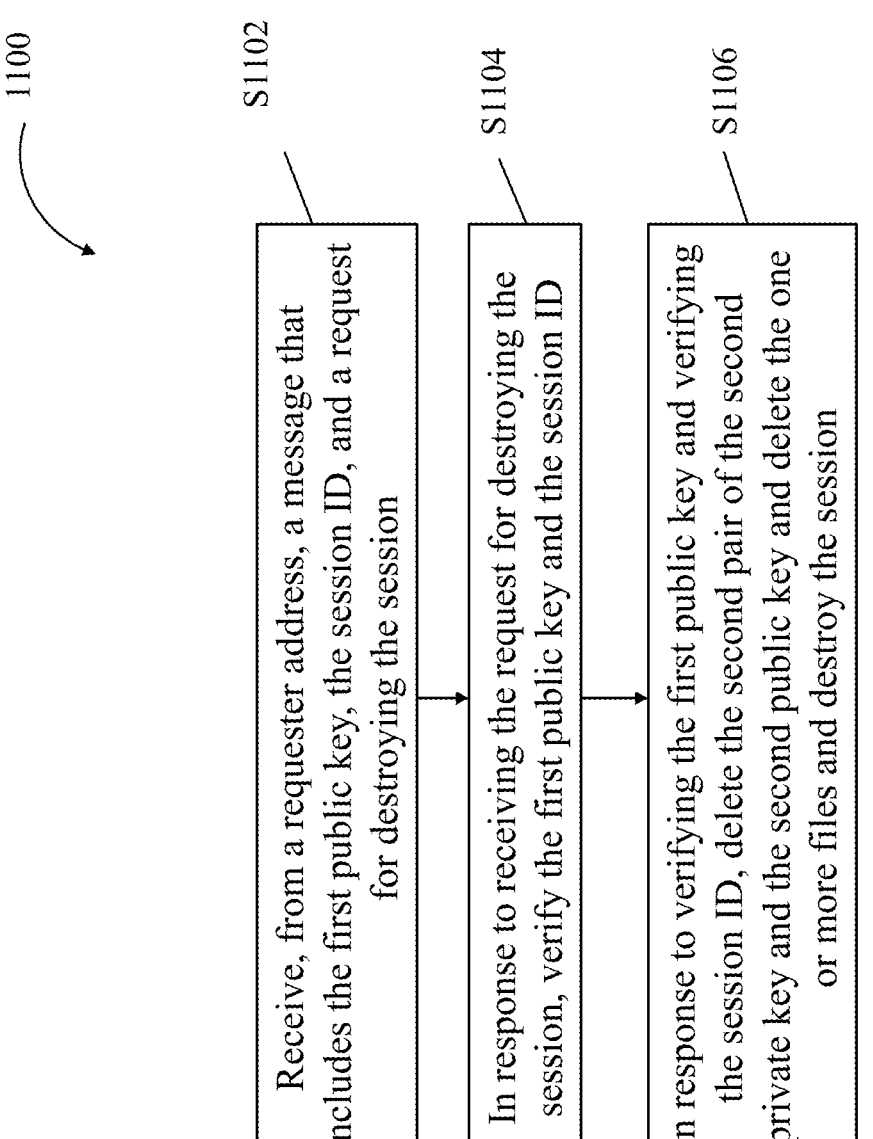

1100

S1102

Receive, from a requester address, a message that includes the first public key, the session ID, and a request for destroying the session

S1104

In response to receiving the request for destroying the session, verify the first public key and the session ID

S1106

In response to verifying the first public key and verifying the session ID, delete the second pair of the second private key and the second public key and delete the one or more files and destroy the session

FIG. 11

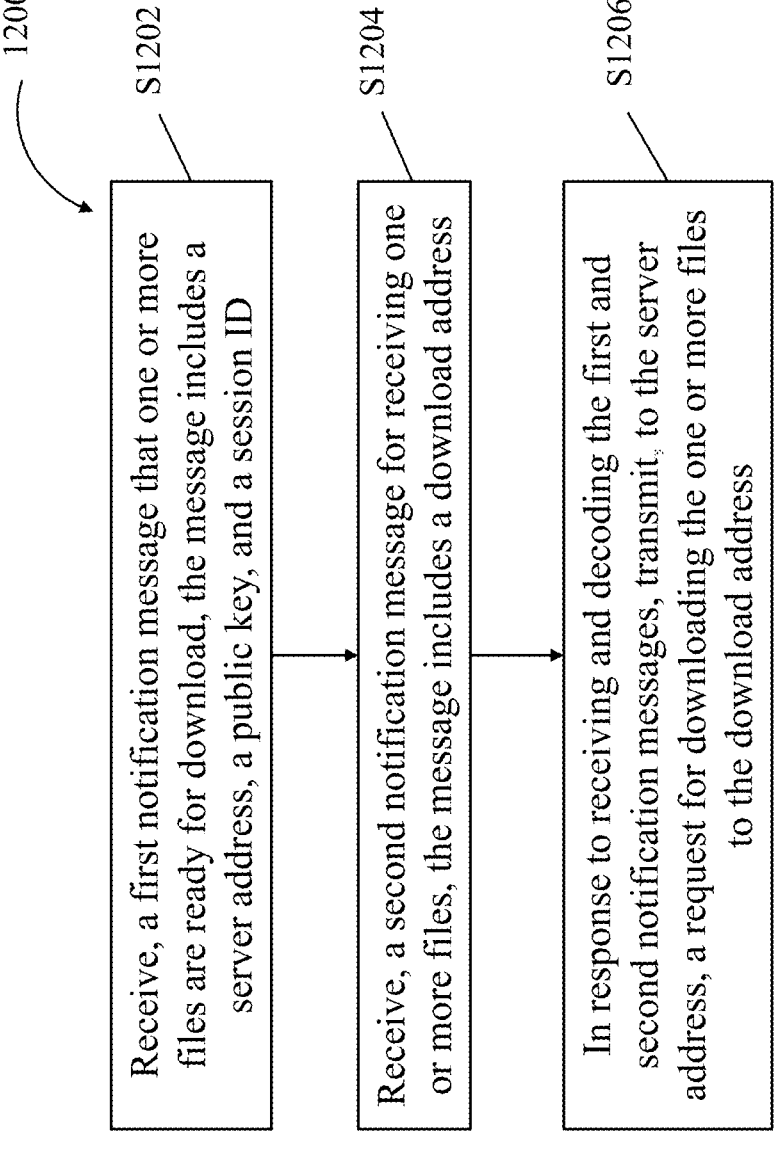

1200

S1202

Receive, a first notification message that one or more files are ready for download, the message includes a server address, a public key, and a session ID

S1204

Receive, a second notification message for receiving one or more files, the message includes a download address

S1206

In response to receiving and decoding the first and second notification messages, transmit, to the server address, a request for downloading the one or more files to the download address

FIG. 12A

AUDIO ASSISTED FILE SHARING

BACKGROUND

Rapidly distributing files such as pictures between people in a gathering and inside a room where the distance between sender and receiver is not more than few meters is desirable and more desirable if the file picture transfer need minimal or no user involvement.

BRIEF DESCRIPTION OF THE DRAWING

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 8 illustrates a flow diagram of a process for file transferring, in accordance with some embodiments of the disclosure.

FIG. 9 illustrates a flow diagram of a process for file transferring, in accordance with some embodiments of the disclosure.

FIG. 10 illustrates a flow diagram of a process for file transferring, in accordance with some embodiments of the disclosure.

FIG. 11 illustrates a flow diagram of a process for file transferring, in accordance with some embodiments of the disclosure.

FIGS. 12A and 12B illustrate flow diagrams of processes for file transferring, in accordance with some embodiments of the disclosure.

DETAILED DESCRIPTION

Figure 1B:
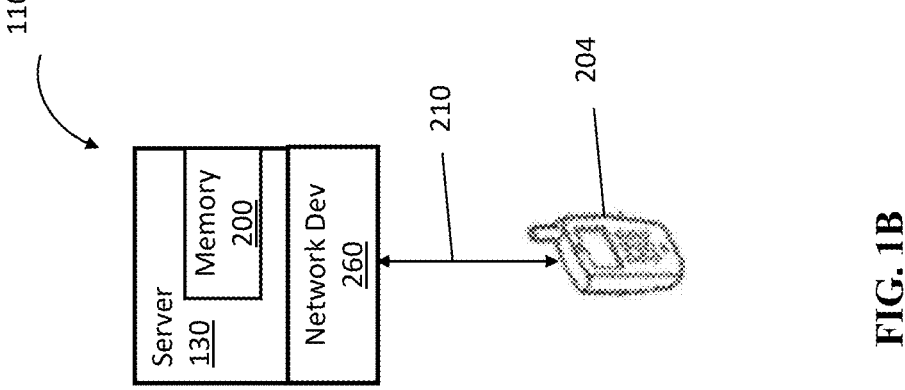
FIGS. 1A and 1B respectively illustrate a file transfer system.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In addition, the term "being made of" may mean either "comprising" or "consisting of." In the present disclosure, the phrase "one of A, B and C" means "A, B and/or C" (A, B, C, A and B, A and C, B and C, or A, B and C), and does not mean one element from A, one element from B and one element from C, unless otherwise described.

In a file transferring system, one or more files, e.g., pictures, documents, audio clips, or video clips, are transmitted between a sender, e.g., requester, and one or more recipients. The file transfer may happen between cell phones, iPads, or laptops and desktops in close proximity, not more than 5 meters, of each other. Each one of the cell phones, iPads, or laptops and desktops have access, via hard wire or wireless, to a server. The sender transmits the one or more files to the server and the recipients receive the one or more files from the server. In some embodiments, a client application A is an application of a client device A that is being executed on a processor of the client device A of the sender communicates through a communication link A with the server and informs the server that one or more files will be uploaded for transfer and requests the server to generate a session by designating a portion of the memory of the server for file transfer. The server, e.g., an application executing on a processor of the server or a server application, generates a session and assigns a session identification (session-ID) to the session. The server application further generates a session-table in a memory of the server and creates a first entry for the session in the session-table. The server application executing on the processor of the server further generates a first pair of a first private key and a first public key associated with the session-ID and stores the session-ID and the first private key in the first entry of the session-table. The server application further transmits the first public key via the communication link A to the client application A of the sender. Receiving the first public key informs the client application A that the session is generated on the server. In response to receiving the first public key by the client application A of the sender, the client application A uploads the one or more files and the first public key to the server. In response to receiving the uploaded files and the first public key by the server, the server verifies the first public key against the first private key and after the verification stores the one or more files in a memory of the server. In response to storing the one or more files, the server application generates a second pair of a second private key and a second public key associated with the session-ID and transmits the second public key via the communication link A to the client application A of the sender. Receiving the second public key informs the client application A that the one or more files are ready for transfer. The server application further stores the second private key in the first entry of the session-table. In some embodiments, the session-ID is transmitted with the first public key to the client application A of the sender and when the sender also uploads the one or more files, the first public key, and the session-ID to the server and the server verifies the session-ID and the first public key as described below.

In some embodiments, the client application A of the sender transmits, e.g., broadcasts, a notification message that includes an address of the server, e.g., a server address, and the second public key. The notification message informs other clients that one or more files are ready for download. In some embodiments, a client application B, is an application of a client device B that is being executed on a processor of the client device B in a vicinity, e.g., less than 5 meters, of the client device A. The client application B may receive the notification message including the server address and the second public key. In some embodiments, the client application A and the client application B are executing on a cell phone or an iPad that are in the vicinity of each other. The cell phone or an iPad may include an audio transmitter, e.g., a speaker, and an audio receiver, e.g., a microphone. In some embodiments, the client application A is executing on a first cell phone and the client application B is executing on a second cell phone. The first cell phone may transmit the notification message via an audio transmitter, e.g., a speaker of the first cell phone, and the second cell phone, e.g., the client application B which is a client application of the second cell phone, may receive the notification message via a microphone of the second cell phone. The client application of the second cell phone may extract the server address and the second public key and send the second public key to the server to request the one or more files. In response to receiving the second public key from the second cell phone, the server may send the one or more files to the second cell phone. In some embodiments, the client application of the second cell phone may extract the server address and the second public key and transmit via an audio transmitter, e.g., the speaker, and send the second public key and the address of the second cell phone to the first cell phone and request the one or more files. In response to receiving the second public key from the second cell phone, the first cell phone sends the download request including the address of the second cell phone and the second public key to the server. The server may send the one or more files to the address of the second cell phone. In some embodiments, the server downloads the one or more files after verifying the second public key based on the second private key in the first entry of the session-table.

In some embodiments, the client application B is executing on a cell phone or an iPad that includes a camera and the client application A is executing on a laptop or desktop that does not have microphone or speaker but includes a display screen. In some embodiments, the client application A is executing one a desktop, and the client application B is executing one a cell phone. Because the desktop does not have a speaker, the desktop generates the notification message as a 2D-barcode, e.g., a quick response code (QR code), on a display screen of the desktop. The 2D-barcode includes the server address and the second public key. The camera of the cell phone scans the 2D-barcode and extracts the server address and the second public key. The cell phone may send the request and the address of the cell phone and the second public key to the server. In response, the server may send, e.g., download, the one or more files to the address of the cell phone. In some embodiments, the visual notification message or the audio notification message includes one or more of the first public key, the second public key, the session-ID, and the server address. The visual notification message and the audio notification message confirm that the one or more files of the session are ready for download. In some embodiments, by capturing and decoding the visual notification message or the audio notification message and then retrieving the first public key, the second public key, the session-ID, and the server address confirms that the one or more files of the session are ready for download.

In some embodiments, the client application A and the client application B are executing on a laptop or a desktop that do not have microphone, speaker, and/or camera but includes a display screen. In some embodiments, the client application A is executing a first desktop, and the client application B is executing one a second desktop. Because the first desktop does not have a speaker or microphone, the first desktop generates the notification message as a first 2D-barcode, e.g., a first QR code, on a display screen of the first desktop. The 2D-barcode includes the server address and the second public key. Because the second desktop does not have a camera, the second desktop may not scan the 2D-barcode. The second desktop may generate a second 2D-barcode, e.g., a second QR code, on a display screen of the second desktop. The first 2D-barcode includes the server address and the second public key, and the second 2D-barcode includes the second desktop address and a request for download. A cell phone, e.g., an application of the cell phone executing on the cell phone may scan, analyze, and decode the first and the second 2D-barcodes and may retrieve, the second public key, the server address, the second desktop address, and the request for download. Then, the cell phone may send the request for download, and the second public key, and the second desktop address to the server address to request the download of the one or more files to the second desktop address. In some embodiments, the first 2D-barcode also includes the session-ID. The cell phone may retrieve the session-ID from the first 2D-barcode and may send the session-ID to the server address with the request for the download. In some embodiments, the server verifies the session-ID and also verifies the second public key against the second private key and after the verifications sends the one or more files to the second desktop address.

Figure 1A:
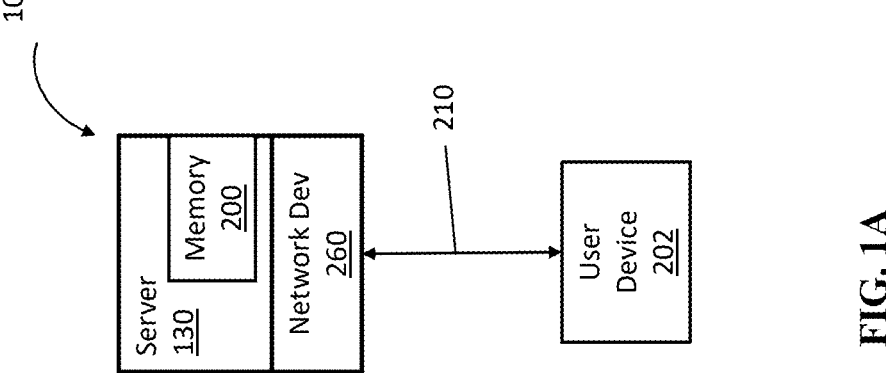

FIGS. 1A and 1B respectively illustrate a file transfer system. FIG. 1A shows a file transfer system 100 that includes a server 130 and the server includes a network device 260, e.g., a network card, and a memory 200 (e.g., a storage memory). The server 130 is connected via a communication link 210, e.g., a communication channel, to a user device 202. In some embodiments, the user device 202 is a mobile device, a laptop computer, or a desktop computer. The user device may communicate via the communication link 210 with the network device 260 of the server 130. FIG. 1B shows a file transfer system 110 that is similar to the file transfer system 100 with a difference that file transfer system 100 has the user device 202 but the file transfer system 110 has a mobile device 204. In some embodiments, the user device 202 or the mobile device 204 sends a request, via the communication link 210, to the server 130 and to request the server 130 to generate a session, e.g., a session 220 of FIG. 2, in the memory 200. The server allocates a portion of the memory 200 and assigns the portion of the memory 200 to the session and sends a response message via the communication link 210 to either the user device 202 or the mobile device 204 to acknowledge the generation of the session in the memory 200, e.g., sending a first acknowledgement message. In some embodiments, in response to receiving the first acknowledgement message, the user device 202 or the mobile device 204 sends, e.g., uploads, one or more files, via the communication link 210, to the server 130 to be stored in the generated session 220.

Figure 2:
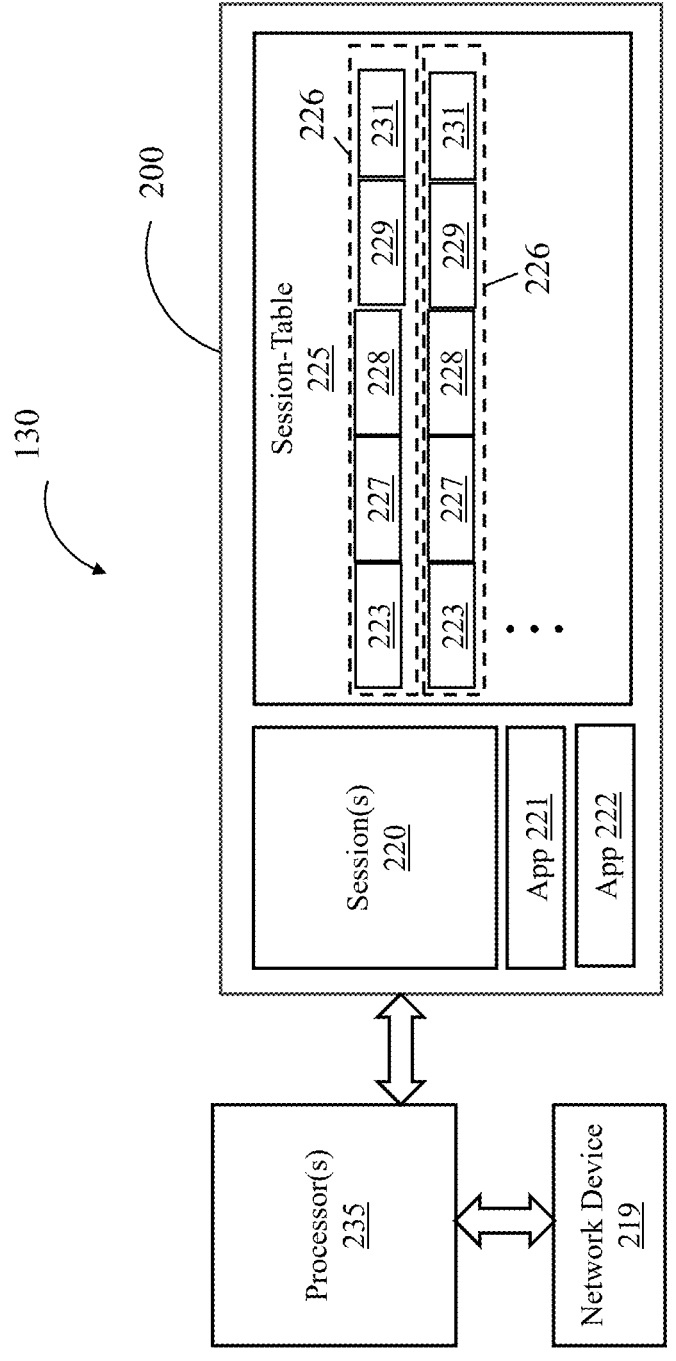
FIG. 2 illustrates a memory structure of a server of a file transfer system, in accordance with some embodiments of the disclosure.

FIG. 2 illustrates a memory structure of a server of a file transfer system, in accordance with some embodiments of the disclosure. FIG. 2 shows the structure of the memory 200 of the file transfer system 110 or the file transfer system 100. The memory 200 is in communication and controlled by one or more processors 235 or controllers. The memory 200 includes one or more sessions 220 and a session-table 225. The session-table 225 may include one or more table entries 226, e.g., rows. Each table entry 226 may include a plurality of elements that may include a first element 223 for storing a session-ID, a second element 227 for storing a memory address of the session, e.g., an address of the memory allocated for the session associated with the session-ID that is in the first element 223. Each table entry 226 may also include a third element 228 for storing a timeout period of the session 220 associated with the session-ID in the first element 223. In some embodiments, instead of the timeout period, when the session 220 is generated, the third element 228 may be set to a link, e.g., an address, to a timer, which is generated when the session 220 is generated. The timer may expire after the timeout period since the timer is generated and the link in the table entry 226 may be set to null when the timer is expired. When the third element 228 is the timeout period, the third element 228 may be the time period the session 220 associated with the session-ID may exist since the session 220 is generated. A processor 235 of the server 130 may keep track of when each session 220 is generated and may periodically check the lifetime of each timer against the timeout period in the third element 228 of each table entry 226 associated with each session. When the session 220 expires, the processor 235 may delete the table entry 226 associated with the session 220 from the session-table 225 and may deallocate the memory of the session 220 associated with the session-ID in the first element 223 of the table entry 226. In some embodiments, deleting the table entry 226 is performed by setting the second element 227 of the table entry 226 for the session to null, e.g., zero, while the session-ID is kept for being reused. Thus, in some embodiments, verifying that a session-ID exists includes finding the session-ID in the first element 223 of one of table entries 226 of the session-table 225 such that in that table entry 226 the second element 227, e.g., the memory address of the session is not null.

In some embodiments, a separate pair of first public key and first private key is assigned to each session and, thus, each table entry 226 is assigned to each separate pair of first public key and first private key. In some embodiments, a user device, e.g., a user device 304, or a mobile device, e.g., a mobile device 308, sends a session-delete request code to the server 130. The session-delete request code may include the session-ID and the first public key associated with the session. After verifying the session-ID exists and after verifying the second public key based on the second private key that may be retrieved from the fifth element 231 of the table entry 226 associated with the session-ID, the session may be deleted.

In some embodiments, before generating the session 220 in the memory 200, the session-table 225 is generated, e.g., created by the processor 235, in memory 200. In some embodiments, in response to receiving the request to generate the session 220 and before sending the first acknowledgement message, the processor 235 of the server 130 generates a pair of a first private key and a first public key associated with the session 220, e.g., associated with the session-ID of the session 220. The processor 235 may send the first public key and the session-ID with the first acknowledgement message and may store the first private key in the table entry 226 associated with the session-ID. In some embodiments, the first private key is stored, by the processor 235, in a fourth element 229 of the table entry 226. The user device 202 or the mobile device 204 may upload the one or more files (e.g., 2, 3, 4, . . . files) via a message. The uploaded message may also include the session-ID and the first public key associated with the session 220 to store the one or more files. The processor 235 may receive the message that includes the one or more files, the session-ID, and the first public key. The server 130 is described in more detail with respect to FIG. 13. The server 130 also includes a network device 219, e.g., the network card. The network device 219 of the server 130 and the network devices 360, e.g., the network card, of one or more user devices 302 and the user device 304 or one or more mobile devices 306 and the mobile device 308 may establish a system network, e.g., a transfer system network, which provides communication between the server 130 and the client devices. The system network may be in communication with each other over the system network. Thus, the requester address or the client address is the network address (e.g., address in the system network) of the requester or the client device, which is one of the one or more user devices 302 and the user device 304 or one of the one or more mobile devices 306 and the mobile device 308. The server address is the network address (e.g., address in the system network) of the server 130. In some embodiments, each one of the one or more user devices 302 and the user device 304 and each one of the one or more mobile devices 306 and the mobile device 308 are a client device and the client address is the network address of the client device. In some embodiments, the network device 219 is a network server that in communication with other network devices 360 establishes the system network between the server 130 and the one or more user devices 302 and the user device 304 and the one or more mobile devices 306 and the mobile device 308. Thus, in the system network, the server 130, the one or more user devices 302 and the user device 304, and the one or more mobile devices 306 and the mobile device 308 each may have an address, which is a network address.

In some embodiments, in response to receiving the uploaded message that includes the one or more uploaded files, the session-ID, and the first public key, the processor 235 verifies the table entry 226 associated with the session-ID exists, retrieves the first private key associated with the session-ID from the table entry 226, and also verifies the first public key against the retrieved first private key. After the verification, the processor 235 stores the one or more files in the session 220 associated with the session-ID. After storing the one or more files, the processor generates a second pair of a second private key and a second public key. The processor further stores the second private key in a fifth element 231 of the table entry 226. The processor 235 further sends a second acknowledgement message to the user device 202 or the mobile device 204 that includes the second public key. FIG. 2 further shows one or more server applications 221 and one or more client applications 222 in the memory 200. The server applications 221 and client applications 222 may be loaded from a storage memory (not shown) to the memory 200. The server application 221 may be executed by one or more processors 235 to control the communication links between the server 130, e.g., the network device 260 of the server 130, and mobiles device

204 and user devices 202. The server application 221 may also control the data and control messages and uploading and downloading files between the server 130 the user device 202 or the mobile device 204. In some embodiments, the client application 222 is downloaded, via a communication link, from the server 130 to the mobile device 204 or the user device 202 to be executed by a processor of the mobile device 204 or the user devices 202. The client application 222 may control the communication link between the server 130, e.g., the network device 260 of the server 130, and the mobile device 204 or the user device 202 from the mobile device 204 or the user device 202. In some embodiments, the session-table 225 is deleted after the memory for each one of the sessions is deallocated and each one of the table entries 226 is deleted.

Figures 3A, 3B, 3C:
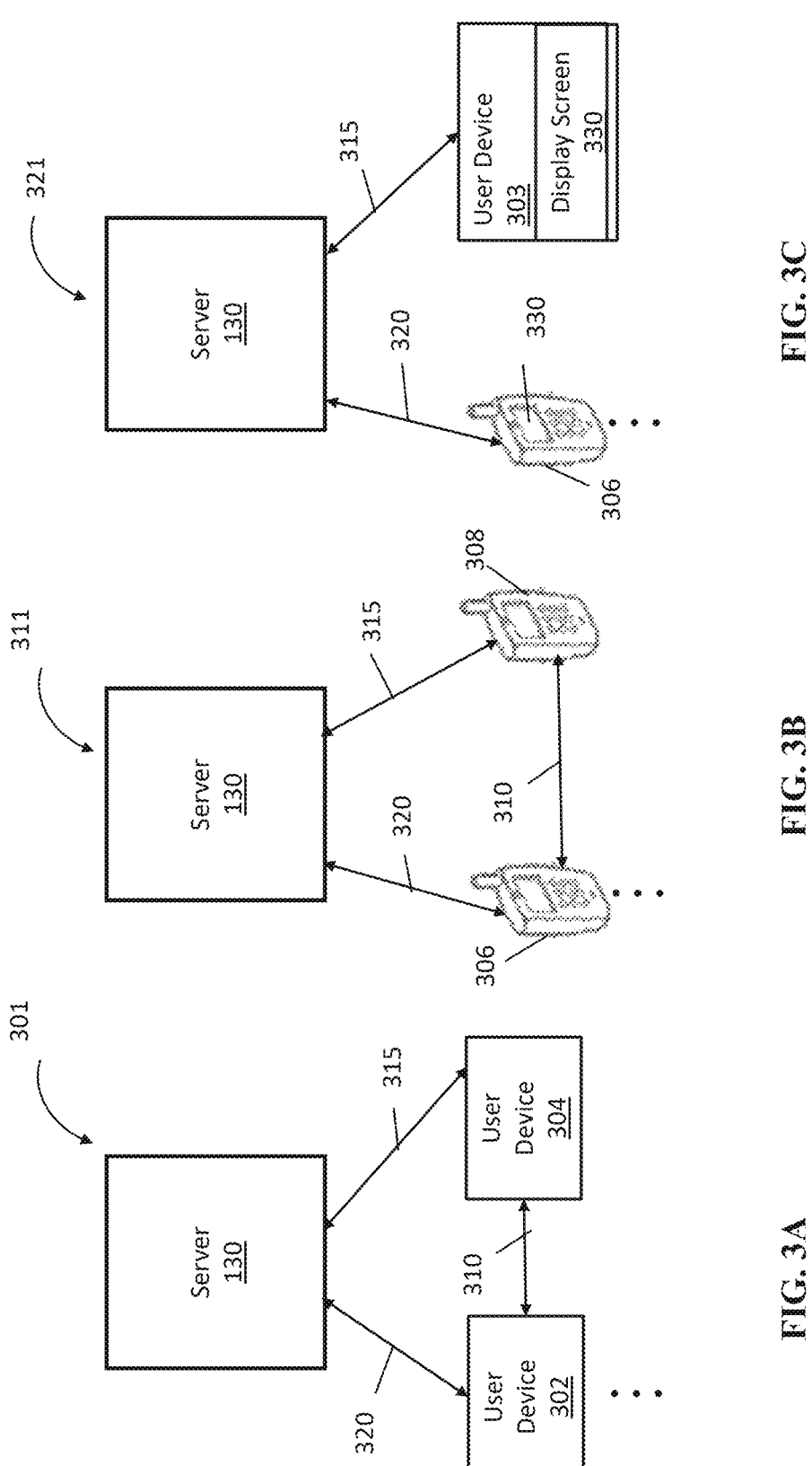
FIGS. 3A, 3B, and 3C respectively illustrate a file transfer system, in accordance with some embodiments of the disclosure.

FIGS. 3A, 3B, and 3C respectively illustrate a file transfer system, in accordance with some embodiments of the disclosure. FIG. 3A shows a file transfer system 301 that includes the server 130, which includes the network device 260 and the memory 200 (not shown). The server 130 is connected via a communication link 315 to a user device 304 and is connected via another communication link 320 to one or more user devices 302. Each one of the one or more user devices 302 is connected via a communication link 310 to the user device 304. Each communication link 310, the communication link 315, or the communication link 320 is either a wired or a wireless communication link in some embodiments. In some embodiments, as described before, the one or more user device 302 or the user device 304 is a mobile device, a laptop computer, or a desktop computer. The user device 304 or the one or more user devices 302 may communicate via the communication link 315 or the communication link 320 with the network device 260 of the server 130. In some embodiments, the communication link 310 is an audio communication link. In some embodiments, the user device 304 sends a request, via the communication link 315, to the server 130 and requests the server 130 to generate a session. The session is generated by allocating a portion of the memory 200 and assigning the portion to the session e.g., a session 220, in the memory 200, and assigning a session-ID to the session 220.

FIG. 3B shows a file transfer system 311 that is similar to the file transfer system 301 with a difference that the file transfer system 311 has the one or more mobile devices 306 and the mobile device 308 instead of the one or more user devices 302 and the user device 304. The server 130 is connected via the communication link 315 to the mobile device 308 and is connected via another communication link 320 to the one or more mobile devices 306. Each one of the one or more mobile devices 306 are connected via a communication link 310 to the user device 304. In some embodiments, the mobile device 308 sends a request, via the communication link 315, to the server 130 and requests the server 130 to generate a session by allocating a portion of the memory 200 and assigning the portion to the session e.g., a session 220, in the memory 200, and assigning a session-ID to the session 220.

In some embodiments, in both file transfer systems 301 and 311, after generating a session 220 and the session-ID, the server 130 further generates the first pair of the first private key and the first public key associated with the session-ID and stores the session-ID in the first element 223 of a table entry 226 of the session-table 225. The processor 235 of the server 130 further stores the first private key in the fourth element 229 of the table entry 226 of the session-table 225. The server 130 further sends a response message via the communication link 315 to either the user device 304 or the mobile device 308 to acknowledge the generation of the session in the memory 200, e.g., sending the first acknowledgement message. In some embodiments, in response to receiving the first acknowledgement message, the user device 304 or the mobile device 308 sends, e.g., uploads, one or more files, via the communication link 315, to the server 130 to be stored in the generated session 220.

After receiving the uploaded one or more files, the server 130, e.g., the processor 235 of the server 130, may store the one or more files in the generated session 220 and may generate a second pair of second private key and a second public key. The processor 235 further stores the second private key in the fifth element 231 of the table entry 226. After receiving the one or more uploaded files, the processor 235 of the server 130 further sends the second acknowledgement message that includes the second public key, via the communication link 315, to the user device 304 or the mobile device 308. The second public key may be used as an indication for to the user device 304 or the mobile device 308 that the uploaded files are stored in the session 220 of the memory 200 and are ready for download.

In some embodiments, the user device 304 or the mobile device 308, in response to receiving the second acknowledgement message, sends a message that includes a file-ready indication code, the second public key, and the session-ID, via the communication link 310, to the one or more of the user devices 302 or the one or more mobile devices 306. The session-ID corresponds to the session 220 that includes the uploaded files. The file-ready indication code may indicate to each one of the one or more user devices 302 or the one or more mobile devices 306 that the uploaded files are ready for download. As noted above, the communication link 310 might be an audio communication link such that an audio transmitter, e.g., a speaker, of the user device 304 or a speaker of the mobile device 308 may send an audio message that includes the file-ready indication code, the second public key, and the session-ID. In addition, an audio receiver, e.g., a microphone, of the one or more user devices 302 or the one or more mobile devices 306 may receive the file-ready indication code, the second public key, and the session-ID. In response to receiving the file-ready indication code, the one or more user devices 302 or the one or more mobile devices 306 may send a download request message that includes a file-download request code, the second public key, and the session-ID to the server 130, e.g., to the server address. By sending the download request message, the one or more user devices 302 or the one or more mobile devices 306 request a download of the one or more uploaded files to the one or more user devices 302 or to the one or more mobile devices 306.

In some embodiments, the server 130, e.g., the processor 235 of the server 130, in response to receiving the file-download request code may download the one or more files after verifying the second public key based on, e.g., against, the second private key. The second private key may be retrieved from the fifth element 231 of the table entry 226, which has a session-ID in the first element 223 that matches the received session-ID in the first element 223 of the table entry 226 of the session-table 225. In some embodiments, the download request message is ignored if no table entry 226 has a session-ID that matches the received session-ID, or if second public key is not verified by the second private key.

Figures 4A, 4B:
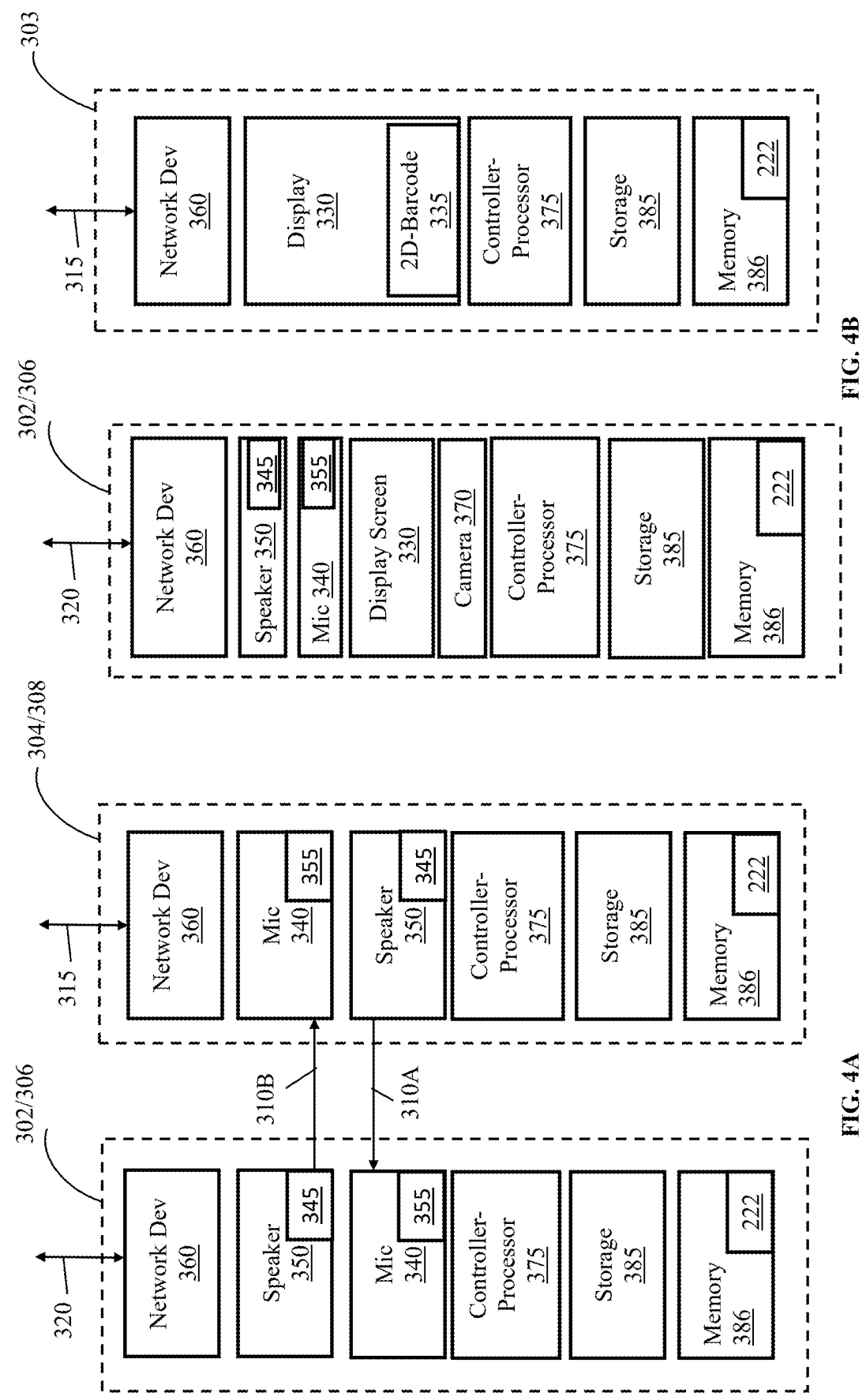
FIGS. 4A and 4B illustrate components of a file transfer system, in accordance with some embodiments of the disclosure.

FIG. 3C shows a file transfer system 321 that is similar to the file transfer system 311 with a difference that the file transfer system 321 has the one or more mobile devices 306 and a user device 303 instead of the one or more mobiles devices 306 and the mobile device 308. In addition, either the user device 303 may not have a speaker or one of the one or more mobile devices 306 may not have a microphone, or both. Thus, one of the one or more mobile devices 306 and the user device 303 may not establish the communication link 310 that is an audio communication link. In some embodiments, the user device 303 is a desktop computer, a laptop computer, or an I-Pad that includes a display screen 330. As described above, the user device 303 may communicate with the server 130 through the communication link 315 to generate a session and upload the one or more files to the server 130. After the uploading the one or more files and after receiving, e.g., in response to receiving, the second acknowledgement message, the user device 303 may produce a 2D-barcode or QR code on the display screen 330 to inform that the one or more files are uploaded and are ready for transfer to other user devices. The 2D-barcode or QR code may include a transfer-request code, a server address, the session-ID, and the second public key. The one or more mobile devices 306, e.g., the camera of the one or more mobile device 306, may capture the 2D-barcode or the QR code, a processor of the one or more mobile devices 306 may analyze and decode the captured 2D-barcode or the QR code to retrieve the transfer-request code, the server address (e.g., address of the server 130), the session-ID, and the second public key. Thus, the communication between the user device 303 and the one or more mobile devices 306 is a visual communication. In response to receiving the transfer-request code, the one or more mobile devices 306 may send a message that includes the transfer-request code to the server 130 to ask the server 130 to download, the one or more files that are uploaded from the user device 303, to the one or more mobile devices 306. The mobile device 306 may also include the session-ID and the second public key in the message that is sent via the communication link 320 to the server 130. As noted above, the download of the one or more files is contingent upon verifying the session-ID and verifying the second public key and is sent by the one or more mobile devices 306 via the communication link 320 to the server 130. In some embodiments, as shown in FIG. 4B, the file transfer system 321 includes the one or more user devices 302 instead of the one or more mobile devices 306. In some embodiments, both the user device 304 and the one or more user devices 302 or the one or more mobile devices 306 and the mobile device 308 are client devices.

In some embodiments, the client application 222 controls the audio, visual, or wireless/wired communication link(s) between the one or more mobile devices 306 and the mobile device 308 or controls the audio, visual, or wireless/wired communication link(s) between the one or more user devices 302, the user device 303, and the user device 304. Receiving the transfer-request code may inform the one or more mobile devices 306 and the mobile device 308 or the one or more user device 302, the user device 303, and the user device 304 that the one or more files are uploaded and are ready for download. The transfer-request code may originate from the server 130 and may be sent to the user device 304 or the mobile device 308 to inform the user device 304 or the mobile device 308 that the one or more files are uploaded (e.g., uploaded to the server address via the communication link 315) and are ready for download. The user device 304 or the mobile device 308 may send the transfer-request code to the one or more user devices 302 or the one or more mobile devices 306. In response to receiving the transfer-request code by the one or more user devices 302 or the one or more mobile devices 306, the one or more user devices 302 or the mobile devices 306 may send a file-download request code via the communication link 320 to the server 130 to ask the server 130 to download the one or more files to the one or more user devices 302 or to the one or more mobile devices 306 that requested the file transfer. In some embodiments, the transfer-request code is the logical one and the file-download request code is the logical zero. In some embodiments, the transfer-request code is a non-zero binary number, e.g., a 4-bit binary number, smaller than 8, and the file-download request code is a 4-bit binary number larger than 8.

In some embodiments, the client application 222 is downloaded by the server 130 to the mobile devices or the user devices after the file transfer is initiated and the client application 222 is deleted after the file transfer is complete and the client application 222 stays in a volatile memory during the file transfer. In some embodiments, the client application 222 is downloaded, e.g., from the server 130, by the mobile devices or the user devices before the file transfer is initiated and is installed in the mobile devices or the user devices and stays in a non-volatile memory of the mobile devices or the user devices. After the file transfer is initiated, the client application 222 is loaded to the volatile memory of the mobile devices or the user devices and is executed by a processor of the mobile devices or the user devices.

FIGS. 4A and 4B illustrate components of a file transfer system, in accordance with some embodiments of the disclosure. FIG. 4A shows the components of the file transfer system 301 or 311. FIG. 4A shows the components of the one or more mobile devices 306 and the mobile device 308 or the one or more user devices 302 and the user device 304. As shown, each one of the one or more mobile devices 306 or the mobile device 308 or each one of the one or more user devices 302 or the user device 304 may include a network device 360. The network device 360 communicates via the communication link 315 or the communication link 320 with the server 130 through the system network. Each one of the one or more mobile devices 306 or the mobile device 308 or each one of the one or more user device 302 or the user device 304 also includes an audio receiver, e.g., a microphone 340, and an audio transmitter, e.g., a speaker 350. Each one of the one or more mobile devices 306 and the mobile device 308 or each one of the one or more user devices 302 and the user device 304 may communicate with each other via the communication link 310, which is an audio communication link. The communication link 310 may include a first audio communication link 310A for sending an audio signal from the speaker 350 of the mobile device 308 or the user device 304 to the microphone 340 of the one or more mobile devices 306 or to the microphone 340 of the one or more user devices 302. The audio signal from the speaker 350 of the mobile device 308 or from the speaker 350 of the user device 304 may be sent after the one or more files are uploaded to the server and the audio signal may include the transfer-request code, the server address, the session-ID, and the second public key. The audio signal may be received by the microphone 340 of the one or more user devices 302 or the one or more mobile devices 306. The communication link 310 may also include a second audio communication link 310B for sending an audio signal, e.g., an acknowledgement or received message, from the speaker 350 of the one or more mobile devices 306 or the one or more user device 302 to the microphone 340 of the mobile device 308 or the microphone 340 of the user device 304. In some embodiments, no acknowledgement or received message is sent.

In some embodiments, the audio communication is established by sending one or more pulses of two or more different tones, e.g., frequencies by the speaker 350 of the user device 304 or the mobile device 308. Thus, the data, which may include the transfer-request code, the server address, the session-ID, and the second public key may be transmitted via the communication link 310 and may be coded into a string of signals such as a string of binary or multiple level pulses, or transmitted as string of signals such that each signal has one of two or more different tones. The string of binary or multiple level pulses, e.g., the transmitted audio signal, may be received by the microphone 340 of the one or more user devices 302 or by the microphone 340 of the one or more mobile devices 306. The controller-processor 375 of the one or more user devices 302 or the controller-processor 375 of the one or more mobile devices 306 receives the captured audio signal of the microphone 340 and extracts the transfer-request code, the server address, the session-ID, and the second public key. In some embodiments, the two or more different tones are either in a first audio ranges of 1 kHz to 4 kHz, in a second audio range of 10 kHz to 15 kHz, or in a third audio range of 20 kHz to 23 kHz, which the third audio range may not be audible. In some embodiments, orthogonal frequency division multiplexing (OFDM) is implemented when transmitting the string of signals such that each signal includes a separate frequency band such that each two signals are orthogonal in the frequency range, e.g., are essentially orthogonal.

As shown in FIG. 4A, each mobile device 306 or 308 and each user device 302 or user device 304 may include a controller-processor 375, a storage memory 385, e.g., a non-volatile memory, and a memory 386, e.g., a volatile memory. As discussed, in an embodiment, the client application 222 is downloaded from the server 130 after the file transfer is initiated and stays in the memory 386 and executed by the controller-processor 375 during the file transfer. Thus, the application is downloaded for each file transfer to each mobile device 306 or 308 and to each user device 302 or 304 and is deleted after the file transfer is complete. In another embodiment, the client application 222 is downloaded, e.g., from the server 130, and is installed on each one of the one or more mobile devices 306 or the mobile device 308 and on each one of the one or more user devices 302 or the user device 304 and during the file transfer the client application 222 is loaded from the storage memory 385 to the memory 386 to be executed by the controller-processor 375 to control the communication link 310, the communication link 315, and the communication link 320. Although not shown, each one of the one or more mobile devices 306 or the mobile device 308 and each one of the one or more user devices 302 or the user device 304 may also include a display screen 330 and/or a camera 370. The components of the one or more user devices 302 and the user device 304 or the components of the one or more mobile devices 306 and the mobile device 308 are directly or indirectly coupled with other components of a same user device or a same mobile device.

FIG. 4B is similar to FIG. 4A with the difference that unlike the user device 304, a user device 303 of FIG. 4B may not include the speaker 350 and the microphone 340 and may not use audio communication with the one or more user devices 302 or the one or more mobile devices 306. Similar to the user device 304 of FIG. 4A, the user device 303 of FIG. 4B may communicate with the server 130 through the network device 360 and the communication link 315 and may request the server 130 to generate a session 220 and may upload the one or more files to the server 130. After uploading the one or more files to the server 130, the user device 303 may generate a 2D-barcode 335, e.g., a QR code, on the display screen 330 of the user device 303. The 2D-barcode 335 may be generated and sent for display by the controller-processor 375 of the user device 303. The transfer-request code, the server address, the session-ID, and the second public key, which is received by user device 303 after one or more files are uploaded to the server 130, may be encoded by the controller-processor 375 into the 2D-barcode 335. In some embodiments, the one or more user devices 302 or the one or more mobile devices 306 also have the display screen 330 and/or the camera 370. As shown in FIGS. 4A and 4B, the speaker 350 may have a signal generator, e.g., an audio signal generator 345, and the microphone 340 may have a signal detector, e.g., an audio detector 355. In some embodiments, the audio signal generator 345 is designed to generate the string of binary or multiple level audio pulses or the string of audio signals that each have a different tone. Thus, the audio signal generator 345 encodes the session-ID, the first public key or the second public key, the address of the server 130, the transfer-request code, and etc., into an audio encoded signal of audio pulses or audio tones. The audio detector 355 is designed to detect the transmitted audio signal generated by the audio signal generator 345 and decode the audio encoded signal to retrieve the session-ID, the first public key or the second public key, the address of the server 130, the transfer-request code, and etc. In some embodiments, the audio signal generator 345 receives a string of electrical signals and generates the string of audio signals. Also, the audio detector 355 receives the audio signals and generates the string of electrical signals and sends the string of electrical signals to the client application 222 to be decoded.

In some embodiments, the camera 370 of the one or more user devices 302 or the camera 370 of the one or more mobile devices 306 captures the 2D-barcode 335 displayed on the display screen 330 of the user device 303. The controller-processor 375 of the user device 302 or the controller-processor 375 of the one or more mobile devices 306 may analyze the captured the 2D-barcode 335 of the user device 303 and may decode the 2D-barcode 335 and retrieve the transfer-request code, the server address, the session-ID, and the second public key. The one or more user devices 302 or the one or more mobile devices 306 may communicate over the system network using the network device 360 and the communication link 320 with the server 130 at the retrieved server address. The one or more user devices 302 or the one or more mobile devices 306 may send the transfer-request code, the session-ID, and the second public key through the communication link 320 to the server 130 to request the download of the one or more files.

As described before, the server 130, e.g., a processor 235 of the server 130 may download the one or more files after verifying the session-ID and after verifying the second public key. The processor 235 may execute the client application 222 in the memory 386 e.g., a random-access memory (RAM). As noted above, the client application 222 may be downloaded from the server 130, by the mobile devices or the user devices before the file transfer is initiated and is installed in the storage memory 385 of the mobile devices or the user devices and stays in the storage memory 385 of the mobile devices or the user devices. After the file transfer is initiated, the client application 222 may be loaded from the storage memory 385 to the memory 386, e.g., the RAM, of the mobile devices or the user devices and the client application 222 is executed by the controller-processor 375 of the mobile devices or the user devices. In some other embodiments, the client application 222 is not installed on the mobile devices or the user devices and is downloaded from the server 130 after the file transfer is initiated and stays in the memory 386 and is executed by the controller-processor 375 during the file transfer. As noted above, the client application 222 may control the file and message transfer through the communication link 315 and the communication link 320 and also may generate the 2D-barcode 335 of the display screen 330 of the user device 303 and/or control the camera to capture, analyze, and decode, the 2D-barcode 335 by the one or more user devices 302 and/or the one or more mobile devices 306. In some embodiments, after capturing the 2D-barcode 335 by the one or more user devices 302 or the one or more mobile devices 306, the captured 2D-barcode 335 is displayed on the display screen 330 of the one or more user devices 302 or the one or more mobile devices 306. Thus, the communication between the user device 303 and the one or more user devices 302 or the one or more mobile device 306 may be a visual communication.

Figures 5A, 5B:
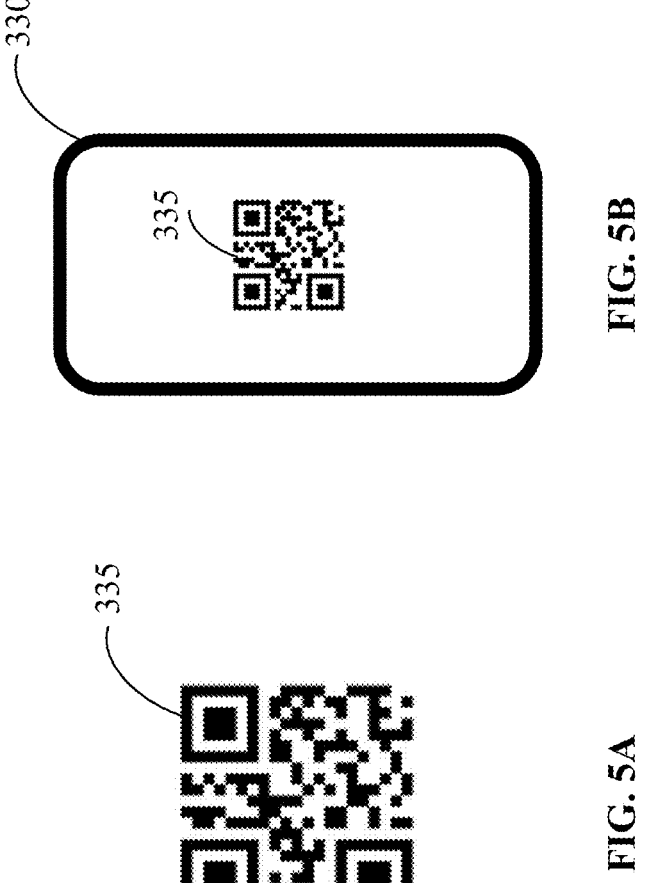
FIGS. 5A and 5B illustrate a two-dimensional (2D) barcode and a captured 2D-barcode.

FIGS. 5A and 5B illustrate a two-dimensional (2D) barcode and a captured 2D-barcode. FIG. 5A shows the 2D-barcode 335 that may be displayed on the display screen 330 of the user device 303. The 2D-barcode 335 may be encoded to include the transfer-request code, the session-ID, the second public key, and the server address. FIG. 5B shows the 2D-barcode 335 on the display screen 330 of user device 303. As noted above, the 2D-barcode 335 may be captured by the camera 370 of the one or more user device 302 or the one or more mobile device 306. Thus, alternatively, FIG. 5B shows the captured 2D-barcode 335 on the display screen 330 of the one or more user device 302 or the one or more mobile device 306.

Figure 6A:
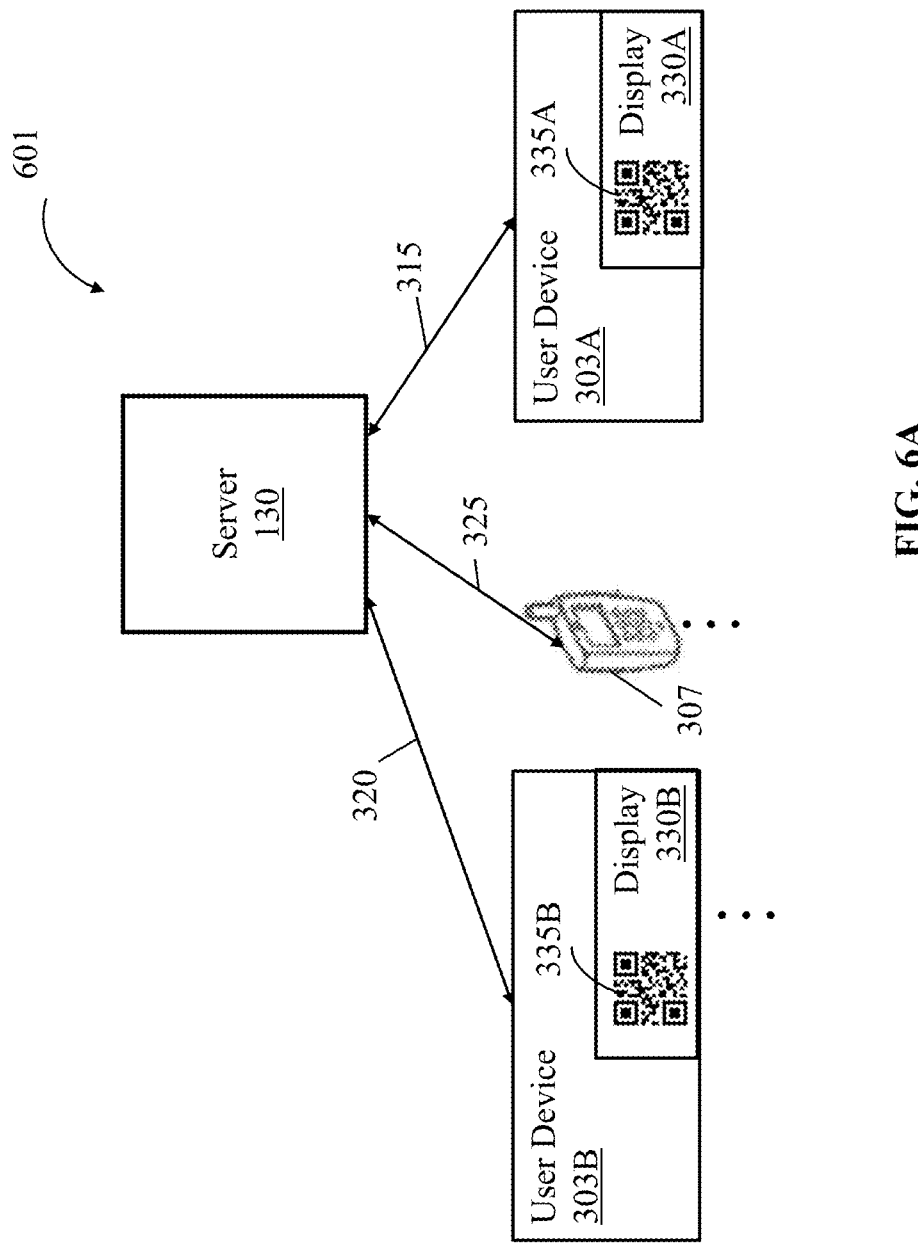
FIGS. 6A and 6B illustrate a file transfer system and components of a file transfer system, in accordance with some embodiments of the disclosure.
Figure 6B:
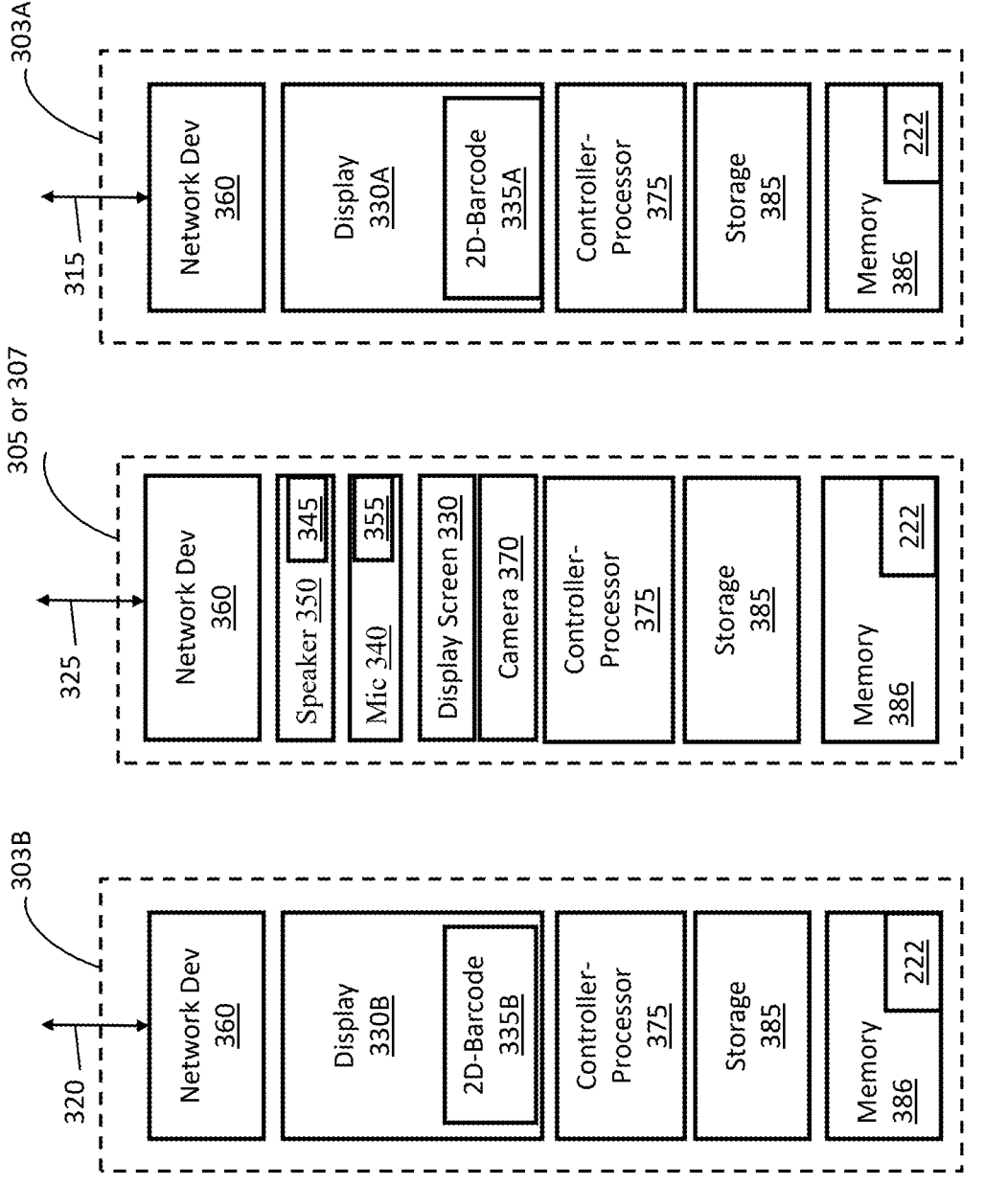

FIGS. 6A and 6B illustrate a file transfer system 601 and components of a file transfer system 601, in accordance with some embodiments of the disclosure. FIG. 6A shows that file transfer system 601 includes a user device 303A and one or more user devices 303B. In some embodiments, the user device 303A and the user devices 303B do not have the microphone 340 and do not have the speaker 350 and, thus, the user devices 303A and 303B may not establish an audio communication link. However, each one of the user devices 303A and 303B respectively include a display screen 330A and a display screen 330B. As shown, the file transfer system 601, also includes a mobile device 307, similar to the one or more mobile devices 306, to perform as intermediate assistant between the user devices 303A and 303B, which are similar to the user device 303. In some embodiments, the user device 303A initiates the file transfer by communicating through the communication link 315 with the server 130 to request the server to generate a session 220. After the server 130 sends the first public key and session-ID to the user device 303A, the user device 303A may upload one or more files to the server 130. In some embodiments, instead of the mobile device 307, a user device 305, similar to the one or more user devices 302, that includes the camera 370 is used to perform as intermediate assistant between the user devices 303A and 303B.

After uploading the one or more files, the server 130 may send the transfer-request code, the server address (e.g., the address of the server 130), the session-ID, and the second public key to the user device 303A. In some embodiments, the session-ID is received with the first public key from the server 130 and in some other embodiments, the session-ID is received with both the first public key and with the second public key. The user device 303A may generate a 2D-barcode 335A to encode the transfer-request code, the server address, the session-ID, and the second public key and may display the 2D-barcode 335A on the display screen 330A of the user device 303A. In some embodiments, the mobile device 307 captures the 2D-barcode 335A, analyzes the 2D-barcode 335A, and decodes the 2D-barcode 335A to retrieve the transfer-request code, the server address, the session-ID, and the second public key. In some embodiments, one or more user devices 303B that are ready for download, e.g., ready for receiving the uploaded files from the server 130, may generate another 2D-barcode 335B on the display screen 330B of the user device 303B. The 2D-barcode 335B may be encoded to include an address of the user device 303B and the file-download request code. The mobile device 307 may also capture the 2D-barcode 335B, analyze the 2D-barcode 335B, and decode the 2D-barcode to retrieve the file-download request code and the address of the user device 303B.

The mobile device 307 may communicate with the server 130 at the retrieved server address, through the communication link 325, to request the server 130 to download the one or more uploaded files to the address of one or more user devices 303B that generated the 2D-barcode 335B. The mobile device 307 may send to the server 130, the session-ID, the second public key, the file-download request code, the transfer-request code, and the address of the user device 303B. After verifying the session-ID and after verifying the second public key, the server 130 may download, via the communication link 320, the one or more uploaded files to the address of the user device 303B. In some embodiments, a separate mobile device 307 or a separate user device 305 is used to perform as intermediate assistant between the user device 303A and each one of the user devices 303B and, thus, multiple mobile devices 307 or multiple user devices 305 are used. In some embodiments, only a single mobile device 307 or a single user device 305 is used to perform as intermediate assistants between the user device 303A and multiple user devices 303B. In some embodiments, the communication link 315, the communication link 320, and the communication link 325 are part of the system network.

FIG. 6B shows the components of the user device 303A, the user device 303B, and the mobile device 307. FIG. 6B is similar to FIGS. 4A and 4B. The user devices 303A and 303B may not include the speaker 350 or the microphone 340 and, thus, may not establish audio communication with each other. However, the user devices 303A and 303B may include the display screen 330A and the display screen 330B to display the 2D-barcodes 335A and 335B. The mobile device 307 may include a camera 370 and a display screen 330. The camera 370 of the mobile device 307 may capture the 2D-barcode 335A and the 2D-barcode 335B on the display screen 330A and on the display screen 330B. The client application 222 of the mobile device 307 may decode the 2D-barcodes 335A and 335B to retrieve the session-ID, the second public key, the transfer-request code, and the address of the user device 303B. Also, the client application 222 of the mobile device 307 may generate the file-download request code and may communicate with the server 130 through the communication link 325 to send the session-ID, the second public key, the file-download request code, the transfer-request code, and the address of the user device 303B to the server 130. After verifying the session-ID and after verifying the second public key the server 130 may download the one or more uploaded files to the one or more user devices 303B that requested for download. Also, the client application 222 of the user devices 303A and 303B may communicate with the server 130 through the communication link 315 and the communication link 320 and may generate the respective 2D-barcodes 335A and 335B and may display the barcodes on the display screen 330A and the display screen 330B. As shown, the speaker 350 may include the signal generator, e.g., the audio signal generator 345, and the microphone 340 may include the signal detector, e.g., the audio detector 355, described above.

Figures 7A, 7B:
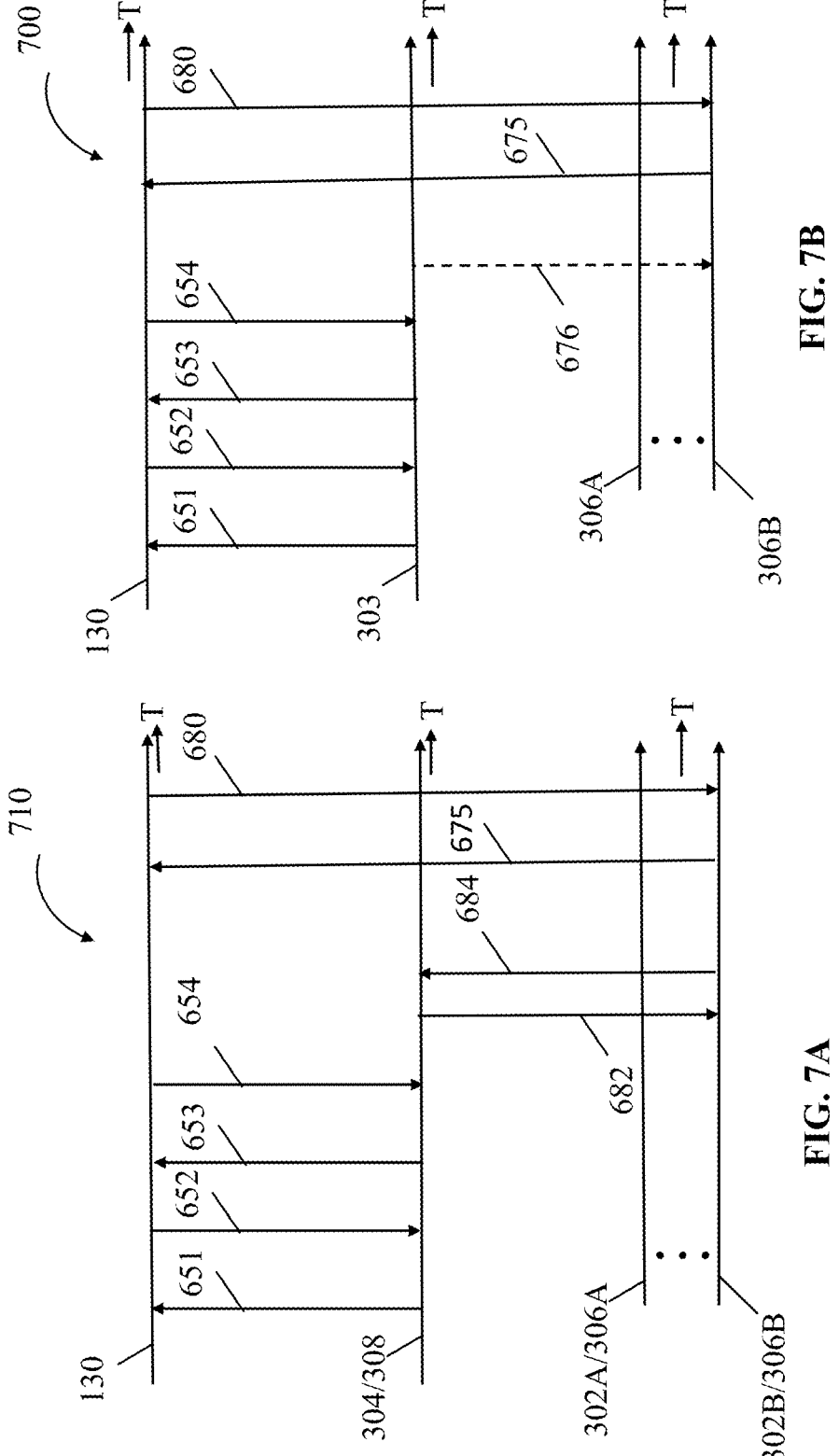
FIGS. 7A, 7B, and 7C illustrate timing diagrams of file transfer systems, in accordance with some embodiments of the disclosure.
Figure 7C:
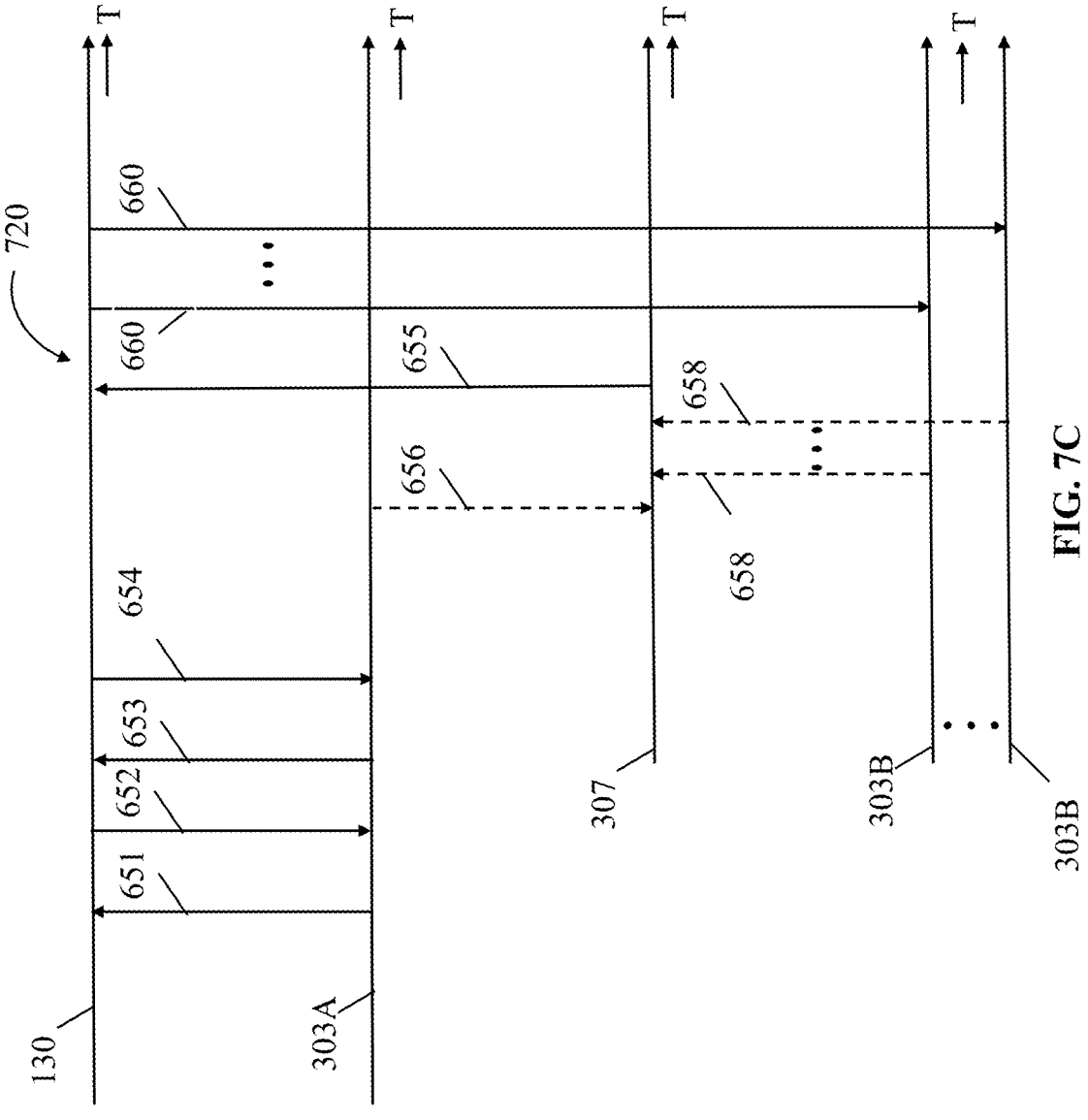

FIGS. 7A, 7B, and 7C illustrate timing diagrams of file transfer systems, in accordance with some embodiments of the disclosure. FIG. 7A shows a timing diagram 710 on a time coordinate (T). FIG. 7A corresponds to FIG. 3A, FIG. 3B, or FIG. 4A. As shown in FIG. 7A, the user device 304 or the mobile device 308 may initiate the file transfer by sending a message 651 to the server 130 to request the server 130 to generate a session. After generating the session, the server 130 may send a message 652 that includes the session-ID of the generated session and a first public key associated with the generated session and the session-ID. The message 652 may indicate that the session is generated and ready for file upload. After, e.g., in response to, receiving the message 652, the user device 304 or the mobile device 308 may send a message 653 that includes one or more files to the server 130 to upload the one or more files to the server 130. The server 130 may receive the one or more files included in the message 653, may store the one or more files in a portion the memory 200, e.g., in a session 220 of the memory 200, of the server 130 and may send a message 654 that may include the transfer-request code, the session-ID, the second public key, and the server address to the user device 304 or the mobile device 308. The messages 651, 652, 653, and 654 may be sent via the communication link 315.

After receiving the second public key, the user device 304 or the mobile device 308 may send a message 682, e.g., an audio message, to the one or more user devices 302, e.g., user devices 302A, 302B, etc., or to the one or more mobile devices 306, e.g., mobiles devices 306A, 306B, etc. In some embodiments, the user device 304 or the mobile device 308 may receive one or more messages 684, e.g., acknowledgement messages, from the one or more user devices 302, e.g., user devices 302A, 302B, etc., or from one or more mobile devices 306, e.g., mobiles devices 306A, 306B, etc. The message 684 may indicate that a user device 302 or a mobile device 306 intends to request the download from the server 130 via the communication link 320. In some embodiments, no messages 684 are generated. After receiving the message 682 that includes the transfer-request code, the session-ID, the second public key, and the server address, one or more user devices 302, e.g., user devices 302A, 302B, etc., or one or more mobile devices 306, e.g., mobiles devices 306A, 306B, etc., by using the server address, may send a message 675 to the server 130 to request the download of the uploaded files from the user device 304 or the mobile device 308. The message 675 may include the transfer-request code, the session-ID, the second public key, and an address of the requester. After verifying the session-ID and verifying the second public key, because of receiving the transfer-request code by the server 130, the uploaded files may be downloaded to one or more user devices 302, e.g., user devices 302A, 302B, etc., or one or more mobile devices 306, e.g., mobiles devices 306A, 306B, etc., in a message 680. The message 680 is sent to the address of the requester that was included in the message 675. The messages 675 and 680 may be sent via the communication link 320 and the messages 682 and 684 may be sent via the communication link 310, e.g., the audio communication link.

FIG. 7B shows a timing diagram 700 on the time coordinate (T) that corresponds to FIG. 3C or FIG. 4B. Similar to FIG. 7A, FIG. 7B shows that the user device 303 may initiate the file transfer by sending the message 651 to the server 130 to request the server 130 to generate the session. After generating the session, the server 130 may send the message 652 that includes the session-ID of the generated session and the first public key associated with the session-ID to indicate that the session is generated and ready for file upload. After receiving the message 652, the user device 303 may send a message 653 that includes one or more files to the server 130 to upload the one or more files to the server 130. The server 130 may receive the one or more files included in the message 653, may store the one or more files in a portion of the memory 200, e.g., in a session 220 of the memory 200, of the server 130 and may send the message 654 that may include the transfer-request code, the session-ID, the second public key, and the server address to the user device 303. The messages 651, 652, 653, and 654 may be sent via the communication link 315.

After receiving the second public key, the user device 303 may display the 2D-barcode 335 on the display screen 330, e.g., display screen, of the user device 303. The 2D-barcode 335 may be encoded to include the transfer-request code, the session-ID, the second public key, and the server address, e.g., the address of the server 130. The camera 370 of one of the mobile devices 306 may capture the 2D-barcode 335 on the display screen 330 of the user device 303. The client application 222 executing by the controller-processor 375 of the user device 303 may encode and generate the 2D-barcode 335 and the client application 222 executing by the controller-processor 375 of the mobile device 306 may analyze and decode the 2D-barcode 335 to retrieve the transfer-request code, the session-ID, the second public key, and the server address. Thus, the message communicated between the user device 303 and the mobile device 306 might be a message 676 (e.g., a visual message).

After decoding the 2D-barcode 335, one or more mobile devices 306, e.g., mobiles devices 306A, 306B, etc., may send a message 675 to the server 130 to request the download of the uploaded files from the user device 303. The message 675 may include the transfer-request code, the session-ID, the second public key, and an address of the requester. After verifying the session-ID and verifying the second public key, because of receiving the transfer-request code by the server 130, the uploaded files may be downloaded to one or more mobile devices 306, e.g., mobiles devices 306A, 306B, etc., in a message 680. The message 680 is sent to the address of the requester that was included in the message 675. The messages 675 and 680 may be sent via the communication link 320.

FIG. 7C shows a timing diagram 720 on the time coordinate (T) that corresponds to FIG. 6A or FIG. 6B. Similar to FIG. 7A, FIG. 7C shows that the user device 303A may initiate the file transfer by sending the message 651 to the server 130 to request the server 130 to generate the session. After generating the session, the server 130 may send the message 652 that includes the session-ID of the generated session and the first public key associated with the session-ID to indicate that the session is generated and ready for file upload. After receiving the message 652, the user device 303A may send a message 653 that includes one or more files to the server 130 to upload the one or more files to the server 130. The server 130 may receive the one or more files included in the message 653, may store the one or more files in a portion of the memory 200, e.g., in a session 220 of the memory 200, of the server 130 and may send the message 654 that may include the transfer-request code, the session-ID, the second public key, and the server address to the user device 303A. The messages 651, 652, 653, and 654 may be sent via the communication link 315.

The client application 222 executed by the controller-processor 375 of the user device 303A may encode and generate a 2D-barcode 335A on the display screen 330A of the user device 303A. In some embodiments, before, after, or simultaneously with, uploading the one or more files to the server 130, the client application 222 executed by the controller-processor 375 of one or more user devices 303B generate other 2D-barcodes 335B on the display screens 330B of the user devices 303B, to indicate that the user devices 303B are requesting and are ready for downloading the uploaded files from the user device 303A. In some embodiments, the 2D-barcodes 335B are displayed when the user devices 303B are turned on. The 2D-barcodes 335B may be encoded to include an address of the user device 303B, e.g., address of the requester, and the file-download request code. One or more mobile devices 307 that perform as intermediate assistant between the user device 303A and each one of the user devices 303B, may capture the 2D-barcode 335A, which is a message 656 (e.g., a visual message), and may capture the 2D-barcode 335B, which is another message 658 (e.g., a visual message). The client application 222 executed by the controller-processor 375 of the mobile device 307 may decode the 2D-barcodes 335A and 335B to retrieve the transfer-request code, the server address, the session-ID, and the second public key and may also retrieve the file-download request code and the addresses of one or more of the user devices 303B. The mobile device 307 may send a message 655 via the communication link 325 to the server 130, which includes the session-ID, the second public key, the file-download request code, the transfer-request code, and the addresses of the user devices 303B. After verifying the session-ID and after verifying the second public key, the server 130 may download, via the communication link 320 and included in a message 660, the one or more uploaded files to the addresses of one or more user devices 303B, e.g., the requesters. In some embodiments, the session-ID verification and the second public key verification are performed by the server 130 in response to receiving the file-download request code. In some embodiments, the verification of the session-ID and the verification of the second public key are performed by the server 130, e.g., by the server application 221 of the server 130, in response to receiving the file-download request code and receiving the transfer-request code.

FIG. 8 illustrates a flow diagram 800 of a process for file transferring, in accordance with some embodiments of the disclosure. The steps of the flow diagram 800 may be executed by the user device 304 or the mobile device 308 and may be implemented between the user devices 302 and 304 of FIG. 3A or between the mobile devices 306 and 308 of FIG. 3B. At step S802, a first request for generating a session is transmitted. The first request may be transmitted in the message 651 by the user device 304 or the mobile device 308 over the communication link 315 to the server 130 as shown in FIGS. 3A and 3B. At step S804, in response to the first request, a session-ID and a first public key associated with the session-ID is received. The session-ID and the first public key may be received in the message 652, by the user device 304 or the mobile device 308, from the server 130 over the communication link 315.

At step S806, in response to receiving the first public key, send the first public key and one or more files. The first public key and the one or more files may be sent in message 653 by the user device 304 or the mobile device 308 over the communication link 315 to the server 130. At step S808, in response to uploading the one or more files to the server 130, a second public key associated with the session-ID is received in the message 654 by the user device 304 or the mobile device 308 over the communication link 315 from the server 130. At step S810, in response to receiving the second public key the message 682, e.g., the notification message. is provided. In some embodiments, the server 130 provides the second public key to the user device 304 or the mobile device 308. In response to receiving the second public key by the user device 304 or the mobile device 308, the user device 304 or the mobile device 308 provides, e.g., sends, over the communication link 310, to one or more user devices 302 or to one or more mobile devices 306, the message 682, e.g., the notification message, that includes the server address, the second public key, and the session-ID. In some embodiments, the communication link 310 is an audio communication link to one or more other user devices 302 or one or more other mobile devices 306. The notification message may inform the user devices 302 or the mobile devices 306 that the one or more files are uploaded and are ready to be transferred or downloaded to one or more other user devices 302 or one or more other mobile devices 306. The message 682 may further include the server address, e.g., the address of the server 130.

In some embodiments, receiving the second public key in the messages 654 and 682 provides a confirmation signal from the server 130 to the user devices 304 and 302 or the mobile devices 306 and 308 that the one or more files are ready for download. In addition, returning the second public key, by the one or more user devices 302 or one or more mobile devices 306 in the message 675 to the server 130, may indicate a request by the one or more user devices 302 or the one or more mobile devices 306 from the server 130 to download the one or more files to the one or more user devices 302 or to the one or more mobile devices 306. The second public key and the session-ID may be provided, in the message 675, by user devices 302 or mobile devices 306 to the server 130 when requesting the download of the one or more files that are already uploaded from the user device 304 or the mobile device 308. The server 130 may download the one or more files, in the message 680, after verifying the session-ID and after verifying the second public key.

In some embodiments, the server 130 provides a transfer-request code to the user device 304 or the mobile device 308, in the message 654, as another indication that the one or more files are ready for download. The user device 304 or the mobile device 308 may transmit, e.g., may send, in the message 682, the transfer-request code, in addition to the session-ID and the second public key, to the one or more user devices 302 or the one or more mobile devices 306 to indicate that the one or more files are ready to be downloaded. In some embodiments, in response to receiving the transfer-request code, the user devices 302 or the mobile devices 306 generate the file-download request code and provide the file-download request code, the session-ID, and the second public key through the communication link 320, in the message 675, to the server 130 to request the download of the one or more files. The server 130 may download the one or more files based on receiving the file-download request code and after verifying the session-ID and verifying the second public key in the message 680. In some embodiments, the user devices 302 or the mobile devices 306 receive the server address, e.g., the address of the server 130, from the user device 304 or the mobile device 308 and establish the communication link 320 using the server address.

FIG. 9 illustrates a flow diagram 900 of a process for file transferring, in accordance with some embodiments of the disclosure. The steps of the flow diagram 900 may be executed by the server 130 of FIGS. 3A, 3B, and 3C to transfer one or more files from the user device 304 to one or more the user devices 302 of FIG. 3A, from the mobile device 308 to one or more mobile devices 306 of FIG. 3B, or from the user device 303 to one or more mobile devices 306 of FIG. 3C. At step S902, a first request for generating a session is received. The first request may be sent, e.g., transmitted, by the user device 304 or 303, or the mobile device 308, and may be received by the server 130, e.g., may be received by the processor 235 of the server 130 in the message 651. At step S904, in response to receiving the first request, a session and a first pair of a first private key and a first public key are generated, and the first public key is transmitted. The server 130 may generate the session and the first pair of the first private key and the first public key. The server 130 may transmit the first public key to the user device 304 or the mobile device 308 to inform the user device 304 or the mobile device 308 that the session is generated. In some embodiments, the session-ID of the generated session is sent with the first public key, in the message 652, by the server 130 to the user device 304 or 303, or to the mobile device 308.

In some embodiments, receiving the session-ID or receiving the first public key is an indication that the session is generated. In some other embodiments, receiving the session-ID and receiving the first public key is an indication that the session is generated. In some embodiments, the requester is the user device 304 or 303, or the mobile device 308 and the requester address is the address (e.g., the network address) of the user device 304 or 303, or the address of the mobile device 308. The first request may be transmitted by the user device 304 or 303, or the mobile device 308, in the message 651, from the requester address, over the communication link 315 to the server 130 of FIGS. 3A, 3B, and 3C. The first request to generate the session in the memory 200 of the server 130 may be received by the server 130. At step S906, in response to transmitting the first public key, the first public key is received back with one or more files in the message 653. In some embodiments, after receiving the first public key or after receiving the first public key and the session-ID by the user device 304 or the mobile device 308, the user device 304 or the mobile device 308 transmits one or more files and sends back the first public key and the session-ID via the communication link 315 to the server 130.

At step S908, the first public key is verified. The server 130 may verify the first public key against the first private key. In some embodiments, the server 130 verifies the first public key and the session-ID. In some embodiments, after receiving the first request, if the session-table 225 does not exist on the server 130, e.g., the server 130 detects that the session-table 225 does not exist in the memory 200 of the server 130, the server 130 generates the session-table 225 and adds a table entry 226 associated with the generated session in the session-table 225. As described above, the session-ID may be stored in the first element 223 of the table entry 226 and the first private key may be stored in the fourth element 229 of the table entry 226. The server 130 may verify the session-ID by searching the first element 223 of the table entries 226 and if the session-ID is found in the session-table 225, the session-ID is verified. In addition, the server 130 may verify the first public key by retrieving the first private key from the fourth element 229 of the table entries 226 that includes the verified session-ID in the first element 223 of the table entries 226. The first private key is retrieved from the table entry 226 and the returned first public key is verified against the first private key.

If the first public key is verified, at step S910, the received one or more files are stored in the session of the memory 200 that corresponds to the session-ID. In response to storing the one or more uploaded files in the session of the memory 200, a second pair of second private key and second public key is generated by the server 130. The server 130 may send the second public key to the user device 304 or the mobile device 308 in the message 654. The second public key is sent with the session-ID to the address of the user device 304 or the address of the mobile device 308. Receiving another public key with the session-ID that is already received with the first public key by the user device 304 or the mobile device 308 indicates that the one or files are stored. The one or more files may be stored in the session 220 of the memory 200 corresponding the session-ID and receiving the second public key may indicate that the one or more files are ready for download. As noted above, a session 220 is generated by allocating a portion of the memory 200 and assigning the portion to the session 220 and assigning the session-ID to the session 220. Thus, the one or more uploaded files may be stored in the allocated portion of the memory 200.

FIG. 10 illustrates a flow diagram 1000 of a process for file transferring, in accordance with some embodiments of the disclosure. The steps of the flow diagram 1000 may be executed by the server 130 of FIGS. 3A, 3B, and 3C to transfer one or more files from the user device 304 to one or more the user devices 302 of FIG. 3A, from the mobile device 308 to one or more mobile devices 306 of FIG. 3B, or from the user device 303 to one or more mobile devices 306 of FIG. 3C. At step S1002, the message 675 that includes one or more requester addresses, a second public key, a session-ID, and a request for downloading one or more files from a session associated with the session-ID is received. The requester addresses might be the addresses of one or more user devices 302 or one or more mobile devices 306 and the message 675 might be received from the one or more user devices 302 or the one or more mobile devices 306. The second public key and the session-ID may be received from the server 130, via the message 654, by the user device 304 or the mobile device 308. The second public key and the session-ID may be received by the one or more user devices 302 or the one or more mobile devices 306 via the message 682 from user device 304 or the mobile device 308. In some embodiments, the request for downloading is the transfer-request code that is received by a user device 302 or a mobile device 306 via the message 682 from the user device 304 or the mobile device 308 and the transfer-request code is sent to the server 130 in the message 675. In some embodiments, the request for downloading is a combination of the transfer-request code and the file-download request code that are sent to the server 130 by one or more user devices 302 or by one or more mobile devices 306 in the message 675. In some embodiments, the file-download request code is a predetermined code generated by the one or more user devices 302 or the one or more mobile devices 306.

At step S1004, in response to receiving the file-download request code and/or the transfer-request codes, the server 130 may verify the session-ID against the session-table 225 and may verify the second public key against the second private key of the table entry 226 having the session-ID. At step S1006, in response to verifying the session-ID and verifying the second public key, the one or more files nay be downloaded to the requester address. The one or more files may be downloaded from the session 220 of the memory corresponding to the session-ID. Thus, the one or more files may be transferred from the user device 304 or the mobile device 308 to one or more user devices 302 or one or more mobile devices 306.

FIG. 11 illustrates a flow diagram 1100 of a process for file transferring, in accordance with some embodiments of the disclosure. The steps of the flow diagram 1100 may be executed by the server 130 of FIG. 1A, 1B, 3A, 3B, or 3C. As described above, the server 130 may generate a session 220 in the memory 200 and generate the corresponding session-ID. Also, the server 130 may generate the session-table 225 in the memory 200, generate a table entry 226 in the session-table 225, generate the first pair of the first private key and the first public key, and store the first private key and the session-ID in the table entry 226. At step S1102, a message that includes the first public key, the session-ID, and a request for destroying the session, e.g., a session-destroy code such as a 4-bit binary code equal to zero, may be received from a requester address. In some embodiments, the requester address is the address of the user device 304 or the address of the mobile device 308 and the message might be received from the user devices 304 or the mobile device 308. The server 130 may receive the message to destroy the session 220 corresponding to the session-ID in the memory 200. At step S1104, in response to receiving the request for destroying the session, the received first public key and the received session-ID may be verified. In response to receiving the message that includes the session-destroy code, the server 130, e.g., the processor 235 of the server 130, may verify the session-ID in two steps. In a first step, the server 130 may verify that a table entry 226 in the session-table 225 exists that includes the session-ID in the first element 223. In a second step, the server 130 may verify that a session 220 associated with the session-ID exists in the memory 200. The existence of the session 220 in the memory 200 may be verified by confirming that the second element 227, e.g., the memory address of the session 220, in the table entry 226 is not null. In some embodiments, before, e.g., prior to, checking the table entry 226 exists, the server 130 checks if the session-table 225 exists.

When the session-ID is verified, the server 130 may verify the first public key against the first private key that is stored in the fourth element 229 of the table entry 226 associated with the session 220. After the session-ID is verified and the first public key is verified, the server 130 may destroy the session by deleting the content of the session 220, deallocating the memory address in the second element 227 of the table entry 226 associated with the session 220, and setting the second element 227 to null.

In some embodiments, when either the session-table 225 does not exist, when the session-ID or the first public key is not verified, or when the second element 227 of the table entry 226 is null, then no action is performed and a message may be returned to the requester to inform the requester of the no action and an explanation that either the session-table 225 did not exist, the session-ID and/or the first public key was not verified, or the second element 227 of the table entry 226 was null. As explained above, each session 220 may have a timeout, e.g., the timeout period. The session 220 may automatically be destroyed by the server 130 after the timeout period or after the timer associated with the session 220 has expired.

At step S1106, in response to verifying the first public key and verifying the session-ID, the second pair of the second private key and the second public key and the one or more files are deleted, and the session is destroyed. After verifying the session-ID and verifying the first public key, the one or more files in the session 220 are deleted and the session 220 is emptied and the session 220 is destroyed by deallocating the memory allocated for the session 220 in the memory 200, which is performed by deallocating the memory address in the second element 227 of the table entry 226 associated with the session 220. In addition, the second pair of the second private key and the second public key may be deleted and the table entry 226 associated with the session 220 may be deleted from the session-table 225 by the server 130. In some embodiments, the first public key and the second public key are also stored in two more elements (not shown) of the table entries 226 of the session-table 225. In some other embodiments, the server 130 keeps the table entry 226 in the session-table 225 to be reused and the session-ID in the first element 223 and the first private key in the fourth element 229 and the first public key are kept but the other elements of the table entry 226 associated with the session 220 are set to zero.

Figure 12B:
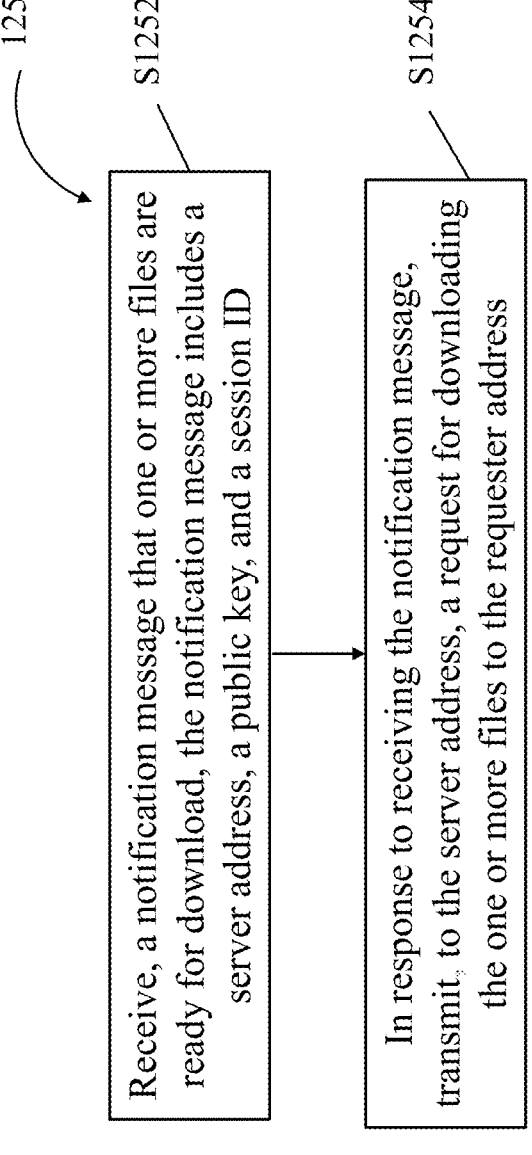

FIGS. 12A and 12B illustrate flow diagrams 1200 and 1250 of processes for file transferring, in accordance with some embodiments of the disclosure. The steps of the flow diagram 1200 of FIG. 12A may be executed by a user device 305 or a mobile device 307 of FIG. 6A or 6B. At step S1202, the message 656, e.g., a first notification message, may be received that one or more files are ready for download. The message may include a server address, a second public key, and a session-ID. In some embodiments, the message 656 is received by visual communication from the user device 303A as shown in FIG. 6A or FIG. 6B. The user device 303A may display the 2D-barcode 335A on the display screen 330A of the user device 303A and the camera 370 of the user device 305 or the camera 370 of the mobile device 307 may capture the 2D-barcode 335A. The controller-processor 375 of the user device 305 or the controller-processor 375 of the mobile device 307 may receive the captured 2D-barcode 335A and may analyze and decode the 2D-barcode 335A to retrieve the server address, the second public key, and the session-ID.

At step S1204, one or more messages 658, e.g., second notification messages, may be received from the one or more user devices 303B. The second notification message may include a request to receive the one or more files from the server 130 and may be received from one or more user devices 305 or one or more mobile devices 307. Each second notification message may include a requester address, e.g., a download address, which is an address of the user device 303B. In some embodiments, the second notification message is received by visual communication from the user device 304B as shown in FIG. 6A or FIG. 6B. The user device 303B may display the 2D-barcode 335B on the display screen 330B of the user device 303B and the camera 370 of the user device 305 or the mobile device 307 may capture the 2D-barcode 335B. The controller-processor 375 of the user device 305 or the mobile device 307 may receive the captured 2D-barcode 335B and may analyze and decode the 2D-barcode 335B to retrieve the address of the user device 303B.

At step S1206, in response to receiving and decoding the first and second notification messages, a request for downloading the one or more files may be transmitted to the server address, e.g., to the server 130, to the download the one or more files to the user device 303B at the requester address. The request for downloading the one or more files may be transmitted by the user device 305 or the mobile device 307. In some embodiments, after receiving the request for downloading the one or more files, the server 130 transmits, e.g., downloads, the one or more files to the user device 303B. As noted above, the first notification message may be displayed on the display screen 330A of the user device 303A after the user device 303A sends the message 651 to the server 130 to request the server 130 to generate the session. Also, the first notification message may be displayed on the display screen 330A of the user device 303A after the user device 303A receives the message 654 that includes the session-ID and the second public key. In some embodiments, the second notification message is displayed by the user device 303B when the user device 303B is ready for receiving files or when the user device 303B turns on. Thus, the user device 303B may not know if the one or more files are uploaded or the server 130 is ready to download the one or more files. The user device 303B displays the second notification message when the user device 303B is ready for receiving the one or more files. In some embodiments, there is one user device 305 or one mobile device 307 assigned for each pair of user devices 303A and 303B that performs as intermediate assistant between each pair of user devices 303A and 303B. In some embodiments, there is only one user device 305 or only one mobile device 307 that is assigned to perform as intermediate assistant between multiple pairs of user devices 303A and 303B.

The steps of the flow diagram 1250 of FIG. 12B may be executed by a user device 302 or a mobile device 306 of FIG. 3C or 4B. At step S1252, the message 676 may be received that one or more files are ready for download and the notification message may include a server address, a second public key, and a session-ID. The step S1252 is the same as the step S1202 where the message 676 is received by visual communication from the user device 303 as shown in FIG. 3C or FIG. 4B. The user device 303 may display the 2D-barcode 335 on the display screen 330 of the user device 303 as shown in FIG. 5B and the camera 370 of the user device 302 or the mobile device 306 may capture the 2D-barcode 335. The controller-processor 375 of the user device 302 or the mobile device 306 may receive the captured 2D-barcode 335 and may analyze and decode the 2D-barcode 335 to retrieve the server address, the second public key, and the session-ID.

At step S1254, in response to receiving and decoding the message 676, transmit, to the server address, a request for downloading the one or more files to the requester address. As shown in FIG. 3C, the message 676 may be received by one or more user devices 302 or by one or more mobile devices 306. Thus, the one or more user devices 302 or the one or more mobile devices 306 may transmit the request for downloading the one or more files to the server 130 via the communication link 320 in the message 675. Thus, the address of the requester may be a target address, e.g., a target transfer address, for downloading the one or more files might be the client address of each one of the one or more user devices 302 or each one of the one or more mobile devices 306. In some embodiments, in response to receiving the request by the server 130, the server 130 downloads the one or more files to the requester address of the requester, e.g., the client address via the message 680.

Figure 13:
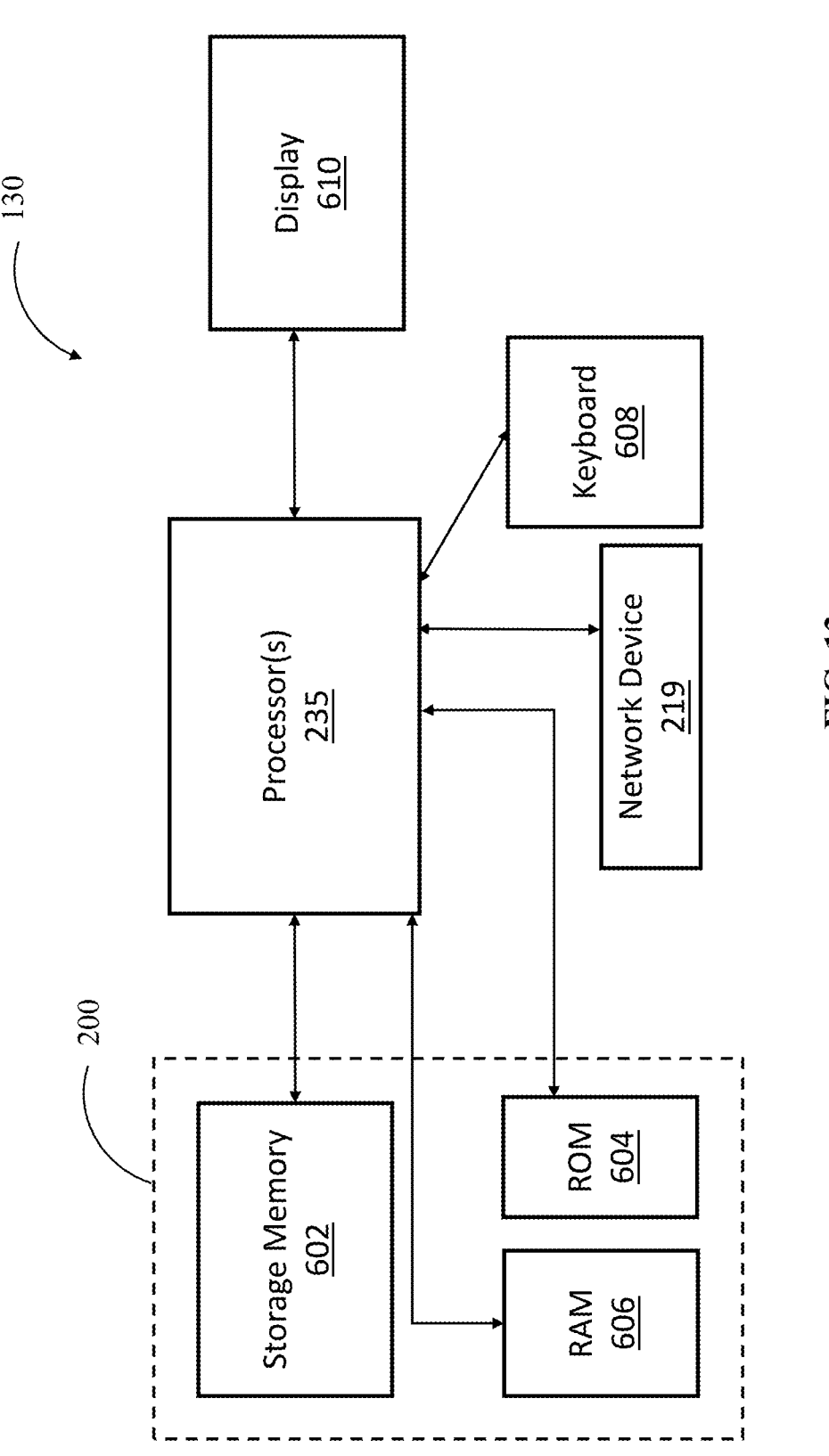
FIG. 13 illustrates a server of a file transferring system.

FIG. 13 illustrates the server 130 of a file transferring system. The server 130 of FIG. 13 is the same server in FIG. 2, however, FIG. 13 shows more details of the server. As shown, the memory 200 of the server 130 may include multiple components such as one or more non-volatile memory, e.g., a storage memory 602 and a read-only memory (ROM) 604. The memory 200 of the server 130 may also include a volatile memory, e.g., a random-access memory (RAM) 606. As shown the server includes one or more processors 235 that are in communication with the components of the memory 200. The server 130 of FIG. 13 also includes a keyboard 608 coupled to the one or more processor for manually communicating with the server 130. The server 130 of FIG. 13 further includes a display screen 610 coupled to the one or more processor 235 for visually communicating with a user of the server. The server 130 of FIG. 13 also includes the network device 219, which is coupled to and in communication with the one or more processors 235. The one or more processor 235 may control the system network coupled between the server 130 and the user devices 302, 303A, 303B, 303, and 304 and the mobile devices 306 and 308 and may control the communication.

According to some embodiments of the present disclosure, a method of file transfer includes transmitting a first request for generating a session, and first receiving a session-ID of the session and a first public key associated with the session-ID. The method also includes that in response to the first receiving the first public key, uploading one or more files, and in response to uploading the one or more files, second receiving a second public key. The method further includes that in response to the second receiving the second public key, generating one of an audio notification message or a visual notification message that the one or more files are uploaded, wherein the one of the audio notification message or the visual notification message comprises the second public key and the session-ID.

In some embodiments, the first request is transmitted to a server address, the first receiving and the second receiving are from the server address, the one or more files are uploaded to the server address, and the one of the audio notification message or the visual notification message further comprises the server address. In some embodiments, a first client device in communication over a communication link to the server address performs the transmitting, the first receiving, the uploading, the second receiving, and the generating the one of the audio notification message or the visual notification message. The one of the audio notification message or the visual notification message is provided to a second client device different from the first client device. In some embodiments, the visual notification message is displayed via a first QR code on a display screen of the first client device. In some embodiments, the method further includes decoding the first QR code, by the second client device, to extract the server address and the second public key, and transmitting to the server address, by the second client device, a second request that includes an address of the second client device as a target address for downloading the one or more files. In some embodiments, the method further includes capturing and decoding the first QR code, by the second client device, to extract the server address and the second public key, receiving, by the second client device, an address of a third client device, and transmitting to the server address, by the second client device, a second request that includes an address of the third client device as a target address for downloading the one or more files. In some embodiments, the method further includes receiving the address of the third client device via capturing and decoding a second QR code on a display screen of the third client device. In some embodiments, the audio notification message includes an audio signal transmitted via an audio transmitter. In some embodiments, the method further includes receiving, by the second client device, the audio notification message by an audio receiver, extracting the server address and the second public key, and transmitting to the server address, by the second client device, a second request that includes an address of the second client device as a target address for downloading the one or more files. In some embodiments, the method further includes transmitting the audio notification message by an audio transmitter, receiving, by the second client device, an address of a third client device, and transmitting to the server address, by the second client device, a second request that includes an address of the third client device as a target address for downloading the one or more files.

According to some embodiments of the present disclosure, a method of file transfer includes transmitting receiving a first request for generating a session, and in response to receiving the first request, generating a session, and generating a first pair of a first private key and a first public key. The method also includes transmitting the first public key and a session-ID associated with the session, and in response to transmitting the first public key, receiving one or more files and the first public key. The method further includes verifying the first public key, in response to verifying the first public key, storing the one or more files in the session, and generating a second pair of a second private key and a second public key, and transmitting a message that includes the second public key and a request for generating one of an audio notification message or a visual notification message.

In some embodiments, the method further includes generating a first table entry in a session-table, and storing the session-ID, the first public key, and the second public key in the first table entry. In some embodiments, the method further includes prior to generating the first table entry, checking if the session-table exists, and is response to detecting that the session-table does not exist, generating the session-table. The session-table includes one or more table entries, and each table entry of the session-table includes six or more elements. In some embodiments, the method further includes assigning a first timeout to the first table entry and the first table entry is automatically deleted after the first timeout, and assigning a second timeout to a second table entry and the second table entry is automatically deleted after the second timeout. In some embodiments, the first request is received from a first requester address, the first public key, the second public key and the session-ID are transmitted to the first requester address, the one or more files are received from the first requester address, and the request for one of the audio notification message or the visual notification message is transmitted to the first requester address. In some embodiments, the method further includes receiving, from a second requester address, the second public key, the session-ID, and a request for downloading the one or more files from the session associated with the session-ID, in response to receiving the second public key, verifying the second public key and the session-ID, and in response to verifying the second public key and the session-ID, downloading the one or more files to the second requester address. In some embodiments, the verifying the second public key and the session-ID includes verifying that the session-table exists, and that the session-table includes a table entry that includes the second public key and the session-ID. In some embodiments, the method further includes receiving, the first public key, the second public key, the session-ID, and a request for destroying the session associated with the session-ID, in response to receiving the request for destroying the session, verifying the first public key, verifying the second public key, and verifying the session-ID, and in response to verifying the first public key, verifying the second public key, and verifying the session-ID, deleting the second pair of the second private key and the second public key, deleting the one or more files of the session, and deleting the session associated with the session-ID. In some embodiments, deleting the session includes deleting the second pair of the second private key and the second public key, deleting the table entry associated with the session-ID in the session-table, and deallocating the memory associated with the session-ID.

According to some embodiments of the present disclosure, a system for file transfer includes a speaker, a network card, and a processor such that an application executing on the processor to: transmit, via the network card, a first request for generating a session to a server address, first receive, via the network card, a session identification (session-ID) of the session and a first public key associated with the session-ID, in response to the first receiving the first public key, upload one or more files, via the network card, to the server address, in response to uploading the one or more files, second receive, via the network card, a second public key, and in response to the second receiving the second public key, generate one of a visual notification message or an audio notification message. The one of the visual notification message or the audio notification message includes the second public key, the session-ID, and the server address to confirm that the one or more files of the session are ready for download.

In some embodiments, the system further includes an audio transmitter, and the audio notification message is transmitted via the audio transmitter. In some embodiments, the system further includes a display screen, and the visual notification message is displayed via a QR code on the display screen.

According to some embodiments of the present disclosure, a system for file transfer includes a volatile memory, a non-volatile storage memory, a network card, and a processor. An application is executing on the processor to: receive, via a network card and from a first client address, a first request to generate a session in either of the volatile memory or the non-volatile storage memory, in response to receiving the first request, generate the session and generate a first pair of a first private key and a first public key, transmit, via the network card, the first public key and a session-ID associated with the session to the first client address, in response to transmitting the first public key, receive one or more files and the first public key, verify the first public key, in response to verifying the first public key, store the one or more files in the session, and generate a second pair of a second private key and a second public key, and transmit, via the network card, a message that includes the second public key and the first client address. The message further includes a request for generating one of an audio notification message or a visual notification message.

In some embodiments, the application further performs: receive, via the network card and from either the first client address or a second client address, a second request to download the one or more files to the second client address. In some embodiments, the application further performs: receive, via the network card and from the second client address, a third request to download the one or more files to a third client address.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of file transfer, comprising:
transmitting a first request for generating a session;
first receiving, at a first time, a session identification (a session-ID) of the session and a first public key associated with the session-ID;
in response to the first receiving the first public key, uploading one or more files;
in response to uploading the one or more files, second receiving, at a second time, a second public key; and
in response to the second receiving the second public key, generating one of an audio notification message or a visual notification message that the one or more files are uploaded, wherein the one of the audio notification message or the visual notification message comprises the second public key and the session-ID.

2. The method of claim 1, wherein the first request is transmitted to a server address, the first receiving and the second receiving are from the server address, the one or more files are uploaded to the server address, and the one of the audio notification message or the visual notification message further comprises the server address.

3. The method of claim 2, wherein a first client device in communication over a communication link to the server address performs the transmitting, the first receiving, the uploading, the second receiving, and the generating the one of the audio notification message or the visual notification message, wherein the one of the audio notification message or the visual notification message is provided to a second client device different from the first client device.

4. The method of claim 3, wherein the visual notification message is displayed via a first quick response (QR) code on a display screen of the first client device.

5. The method of claim 4, further comprising:
decoding the first QR code, by the second client device, to extract the server address and the second public key; and
transmitting to the server address, by the second client device, a second request that comprises an address of the second client device as a target address for downloading the one or more files.

6. The method of claim 4, further comprising:
capturing and decoding the first QR code, by the second client device, to extract the server address and the second public key;
receiving, by the second client device, an address of a third client device; and
transmitting to the server address, by the second client device, a second request that comprises the address of the third client device as a target address for downloading the one or more files.

7. The method of claim 6, further comprising:
receiving the address of the third client device via capturing and decoding a second QR code on a display screen of the third client device.

8. The method of claim 3, wherein the audio notification message comprises an audio signal transmitted via an audio transmitter.

9. The method of claim 3, further comprising:
receiving, by the second client device, the audio notification message by an audio receiver;
extracting the server address and the second public key; and transmitting to the server address, by the second client device, a second request that comprises an address of the second client device as a target address for downloading the one or more files.

10. The method of claim 3, further comprising:
transmitting the audio notification message by an audio transmitter;
receiving, by the second client device, an address of a third client device; and
transmitting to the server address, by the second client device, a second request that comprises the address of the third client device as a target address for downloading the one or more files.

11. A method of file transfer, comprising:
receiving a first request for generating a session;
in response to receiving the first request, generating the session and a session identification (a session-ID) associated with the session, and generating a first pair of a first private key and a first public key;
transmitting the first public key and the session-ID;
in response to transmitting the first public key, receiving, at a first time, one or more files and the first public key;
verifying the first public key;
in response to verifying the first public key, storing the one or more files in the session, and generating a second pair of a second private key and a second public key; and
transmitting, at a second time, a message that comprises the second public key and a request for generating one of an audio notification message or a visual notification message.

12. The method of claim 11, further comprising:
generating a first table entry in a session-table; and
storing the session-ID, the first public key, and the second public key in the first table entry.

13. The method of claim 12, further comprising:
prior to generating the first table entry, checking if the session-table exists; and
is response to detecting that the session-table does not exist, generating the session-table, wherein the session-table comprises one or more table entries, and wherein each table entry of the session-table comprises six or more elements.

14. The method of claim 12, further comprising:
assigning a first timeout to the first table entry, wherein the first table entry is automatically deleted after the first timeout; and
assigning a second timeout to a second table entry, wherein the second table entry is automatically deleted after the second timeout.

15. The method of claim 12, wherein the first request is received from a first requester address, the first public key, the second public key and the session-ID are transmitted to the first requester address, the one or more files are received from the first requester address, and the request for one of the audio notification message or the visual notification message is transmitted to the first requester address.

16. The method of claim 12, further comprising:
receiving, from a second requester address, the second public key, the session-ID, and a request for downloading the one or more files from the session associated with the session-ID;
in response to receiving the second public key, verifying the second public key and the session-ID; and
in response to verifying the second public key and the session-ID, downloading the one or more files to the second requester address.

17. The method of claim 16, wherein the verifying the second public key and the session-ID comprises verifying that the session-table exists and comprises a table entry that comprises the second public key and the session-ID.

18. The method of claim 11, further comprising:

receiving, the first public key, the second public key, the session-ID, and a request for destroying the session associated with the session-ID;

in response to receiving the request for destroying the session, verifying the first public key, verifying the second public key, and verifying the session-ID; and in response to verifying the first public key, verifying the second public key, and verifying the session-ID, deleting the second pair of the second private key and the second public key, deleting the one or more files, and deleting the session associated with the session-ID.

19. The method of claim 17, wherein deleting the session comprises deleting the second pair of the second private key and the second public key, deleting the table entry associated with the session-ID in the session-table, and deallocating the memory associated with the session-ID.

20. A system comprising:

a speaker;

a network card; and a processor, wherein an application executing on the processor is configured to:

transmit, via the network card, a first request for generating a session to a server address;

receive, at a first time and via the network card, a session identification (a session-ID) of the session and a first public key associated with the session-ID;

in response to the first receiving the first public key, upload one or more files, via the network card, to the server address;

in response to uploading the one or more files, receive, at a second time and via the network card, a second public key; and in response to the second receiving the second public key, generate one of a visual notification message or an audio notification message that the one or more files are uploaded, wherein the one of the visual notification message or the audio notification message comprises the second public key, the session-ID, and the server address to confirm that the one or more files of the session are ready for download.

21. The system of claim 20, further comprising:

an audio transmitter, wherein the audio notification message is transmitted via the audio transmitter.

22. The system of claim 20, further comprising:

a display screen, wherein the visual notification message is displayed via a QR code on the display screen.

23. A system comprising:

a volatile memory;

a non-volatile storage memory;

a network card; and a processor, wherein an application executing on the processor is configured to:

receive, via the network card and from a first client address, a first request to generate a session in either of the volatile memory or the non-volatile storage memory;

in response to receiving the first request, generate the session and generate a first pair of a first private key and a first public key;

transmit, via the network card, the first public key and a session-ID associated with the session to the first client address;

in response to transmitting the first public key, receive, at a first time, one or more files and the first public key;

verify the first public key;

in response to verifying the first public key, store the one or more files in the session, and generate a second pair of a second private key and a second public key; and transmit, at a second time and via the network card, a message that comprises the second public key and the first client address, wherein the message further comprises a request for generating one of an audio notification message or a visual notification message.

24. The system of claim 23, wherein the application is further configured to:

receive, via the network card and from either the first client address or a second client address, a second request to download the one or more files to the second client address.

25. The system of claim 24, wherein the application is further configured to:

receive, via the network card and from the second client address, a third request to download the one or more files to a third client address.

* * * * *